United States Patent [19]

Ishikawa et al.

[11] Patent Number: 5,049,909
[45] Date of Patent: Sep. 17, 1991

[54] PHOTOGRAPHIC CAMERA PROVIDED WITH AN ELECTRICALLY FILM DRIVING SYSTEM

[75] Inventors: Norio Ishikawa; Takeshi Egawa, both of Osaka, Japan

[73] Assignee: Minolta Camera Kabushiki Kaisha, Osaka, Japan

[21] Appl. No.: 638,143

[22] Filed: Jan. 9, 1991

Related U.S. Application Data

[63] Continuation of Ser. No. 346,542, May 2, 1989, abandoned.

[30] Foreign Application Priority Data

May 4, 1988 [JP] Japan .................. 63-109749

[51] Int. Cl.$^5$ ................................. G03B 1/12
[52] U.S. Cl. .................................. 354/173.1
[58] Field of Search ................ 354/173.1, 173.11

[56] References Cited

U.S. PATENT DOCUMENTS

| | | | |
|---|---|---|---|
| 3,710,705 | 1/1973 | Kimura | 354/173.1 |
| 3,840,884 | 10/1974 | Omeda | 354/173.1 |
| 3,853,396 | 12/1974 | Ogist et al. | 354/173.1 |
| 4,303,321 | 12/1981 | Enomoto et al. | 354/25 |
| 4,429,965 | 2/1984 | Enomoto et al. | 354/402 |
| 4,451,729 | 5/1984 | Takagi et al. | 250/204 |
| 4,679,926 | 7/1987 | Suzuki et al. | 354/173.11 |
| 4,697,899 | 10/1987 | Kawamura et al. | 354/173.11 |

FOREIGN PATENT DOCUMENTS 63-13522 3/1988 Japan .
63-172252 7/1988 Japan .

Primary Examiner—Michael L. Gellner
Attorney, Agent, or Firm—Burns, Doane, Swecker & Mathis

[57] ABSTRACT

A photographic camera having an electrically film driving function is provided with an electric motor for driving a film loaded in the camera, a motor driving circuit for driving the electric motor in either one of a high speed mode in which the film is driven at a high speed and a silence mode in which the film is driven relatively quietly at a low speed, a manually operable switch to be operated manually when the high speed mode is switched to the silence mode or vice versa, and a control unit for switching between the high speed mode and the silence mode in compliance with operation of the aforementioned switch in a specific camera sequence. Any photographer can select either one of the high speed mode and the silence mode in accordance with photographing situations, using such a camera.

15 Claims, 16 Drawing Sheets

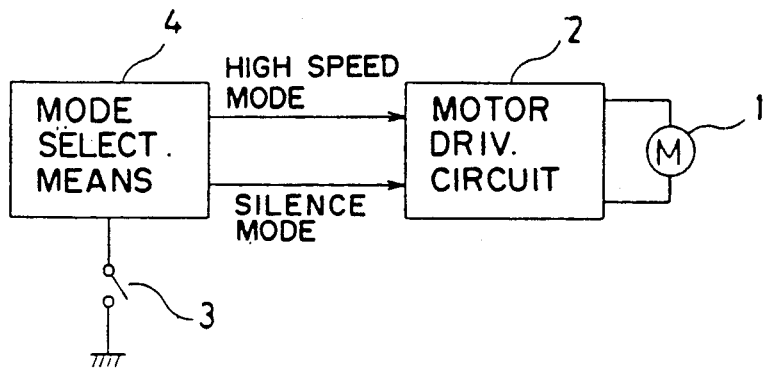
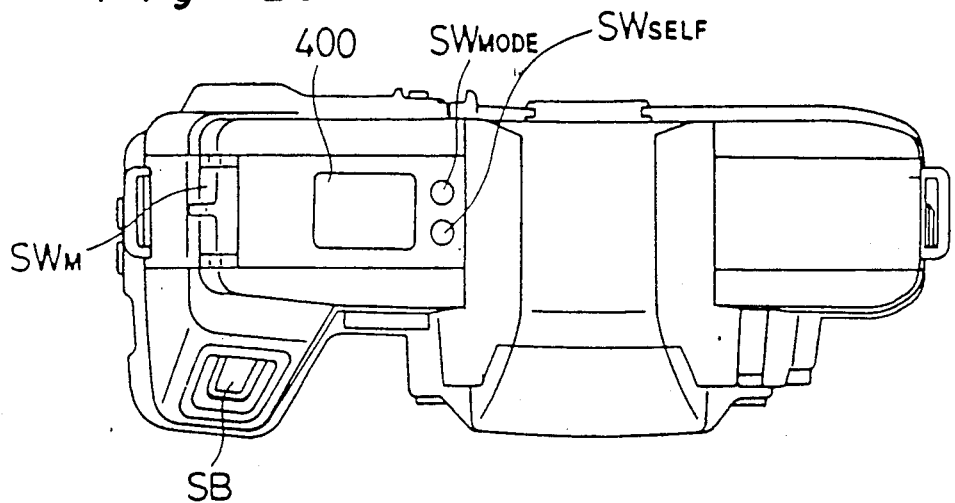
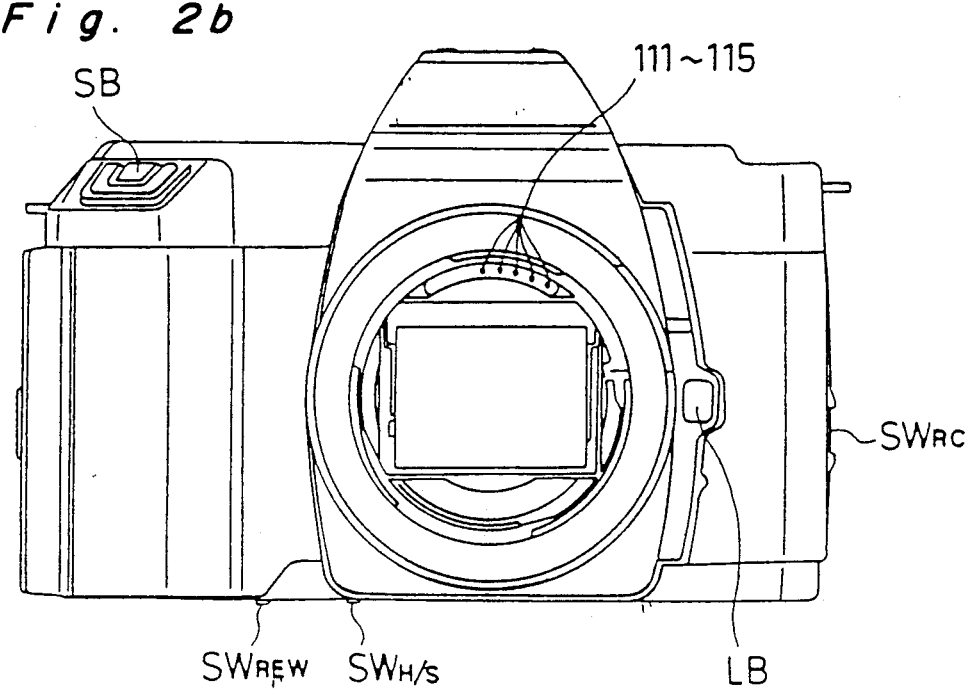

PHOTOGRAPHIC CAMERA PROVIDED WITH AN ELECTRICALLY FILM DRIVING SYSTEM

This application is a continuation, of application Ser. No. 07/346,542, filed May 2, 1989, now abandoned.

BACKGROUND OF THE INVENTION

1. Field of the Invention

The present invention generally relates to a photographic camera, and more particularly, to a photographic camera having an electrical film advancing and/or rewinding function.

2. Description of the Related Art

Conventionally, a photographic camera having a motorized drive device for electrically advancing a film is well known in which the film advancing speed can be switched to either one of, for example, 5 frames/sec, 3 frames/sec, 2 frames/sec and the like. Such switching of the film advancing speed is done not for changing the operation sound of an electric drive motor, but for determining the number of releases per second. Accordingly, the switching of the film advancing speed is not done by changing the speed of the drive motor, but is merely done by changing the waiting time in a pause for a film advancing sequence.

A great effort has been made for automatically advancing and/or rewinding a film at a relatively high speed whereas there still exists a strong demand to lower the operation sound. Particularly, in a place needing silence, for example, in a concert hall, wedding hall or the like, the operation sound of the photographic camera is disfavored. Although the photographic camera requires both high speed and silence, it is very difficult to satisfy both simultaneously. Accordingly, it is considered that disfavor resulting from the operation sound can be overcome to some extent by preferentially selecting either high speed or silence in accordance with photographing situations.

SUMMARY OF THE INVENTION

Accordingly, the present invention has been developed to substantially eliminate the above described disadvantage inherent in the prior art photographic camera, and has for its essential object providing an improved photographic camera provided with an electrical film driving system which is capable of reducing operation sound as an occasion demands.

Another important object of the present invention is to provide a photographic camera of the above described type which is stable in functioning and can be readily manufactured at a low cost.

In accomplishing these and other objects, the photographic camera according to one preferred embodiment of the present invention is provided, as shown in FIG. 1, with an electric motor 1 for driving a film charged in the camera, a motor driving circuit 2 for driving the electric motor 1 in either one of a high speed mode in which the film is driven at a high speed and a silence mode in which the film is driven relatively quietly at a low speed, a manually operable switch 3 to be operated manually when the high speed mode is switched to the silence mode or vice versa, and a mode selector means 4 for switching between the high speed mode and the silence mode in compliance with operation of the switch 3 in a specific camera sequence.

The switch 3 may comprise a slide switch slidable between a position for selecting the high speed mode and another position for selecting the silence mode. The switch 3 may comprise a push switch which also serves as a film rewinding button. In the latter, the silence mode is selected when the switch 3 is in operation whereas the high speed mode is selected when the switch 3 is out of operation. Alternatively, the switching may be done between the high speed mode and the silence mode whenever the switch 3 is operated.

Accordingly, a photographer can select the high speed mode when he wishes to drive the film at a high speed, notwithstanding relatively large sound of operation. In contrast, he can select the silence mode when he wishes to lower the sound of operation, notwithstanding a low film driving speed. Accordingly, any photographer can select either one of the high film driving speed and the silence in accordance with photographing situations.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein;

FIG. 1 is a block diagram indicative of the fundamental constitution of the present invention;

FIG. 2a is a top plan view of a photographic camera to which the present invention is applied;

FIG. 2b is an elevational view of the camera of FIG. 2a;

FIG. 10b is a timing chart obtained from the circuit of FIG. 10a;

DETAILED DESCRIPTION OF THE PREFERRED EMBODIMENTS

FIGS. 2a and 2b illustrate a photographic camera to which the present invention is applied. The illustrated photographic camera is provided with various switches or buttons, for example, a shutter release button SB, a lens interchange button LB and the like. Upon depression of the shutter release button SB by the first half stroke, a light measuring switch SW1 is turned on so that the operation of a light measuring circuit may be initiated. Upon further depression of the shutter release button SB to the end, a release switch SW2 is turned on so that the shutter release operation may be initiated. When the lens interchange button LB is depressed, an interchangeable lens can be removed. The light measuring switch SW1, the light measuring circuit, the release switch SW2, other switches $SW_M$, $SW_{MODE}$, $SW_{REW}$, $SW_{H/S}$ and $SW_{RC}$, a plurality of electric contacts 111–115 and an LCD panel 400 will be described hereinafter.

Figure 3:
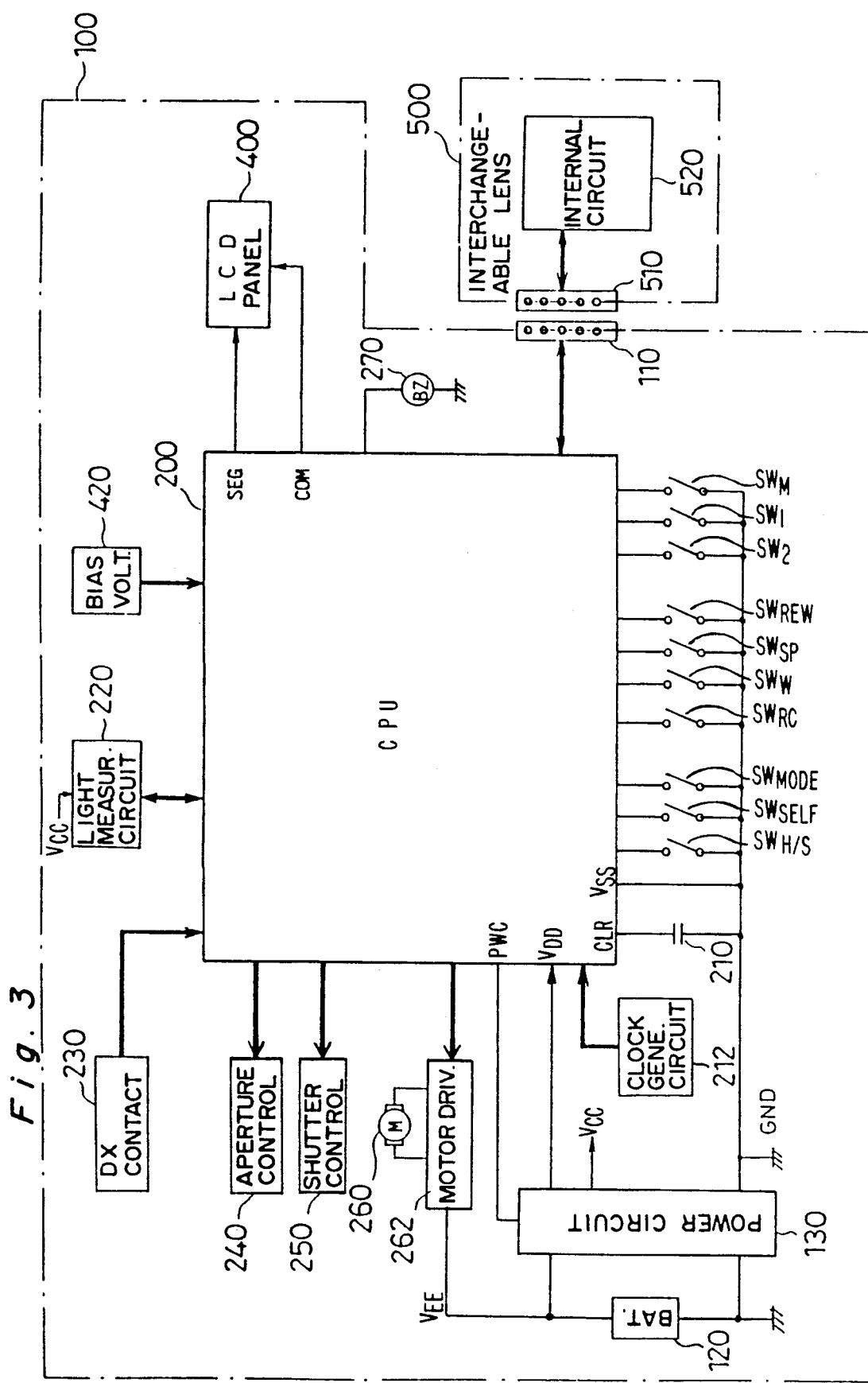
FIG. 3 is an entire circuit diagram of the camera of FIGS. 2a and 2b.

FIG. 3 is an entire circuit diagram of the camera of FIGS. 2a and 2b, indicative of an electric circuit 100 inside the camera body including a CPU 200 and its peripheral circuits, and an electric circuit 520 inside an interchangeable lens 500. The camera body is provided at its mounting portion with a group of electric contacts 110, which are electrically connected to a group of electric contacts 510 formed at the mounting portion of the interchangeable lens 500. The CPU 200 of the camera body internal circuit 100 exchanges information with the interchangeable lens internal circuit 520 through respective electric contacts 110 and 510. The circuit 100 is provided with a battery 120 and a power circuit 130 connected to the battery 120. Both the circuits 100 and 520 are supplied with electricity from the battery 120. The power circuit 130 stabilizes an electric voltage $V_{EE}$ outputted from the battery 120 to supply stabilized voltages $V_{CC}$ and $V_{DD}$ to various locations. The voltage $V_{DD}$ is always outputted from the power circuit 130 and supplied to the CPU 200 whereas the voltage $V_{CC}$ is under on-off control and supplied to other circuits. A motor driving circuit 262 is supplied with the voltage $V_{EE}$ directly from the battery 120. The CPU 200 outputs a power circuit control signal PWC to the power circuit 130. The stabilized voltage $V_{CC}$ is outputted from the power circuit 130 when the signal PWC is at a low level whereas the former $V_{CC}$ is intercepted when the latter PWC is at a high level. For example, when electric power is required to be supplied to a light measuring circuit 220 or the like, the signal PWC is rendered to be at a low level.

The CPU 200 controls various operations such a light measurement, display, exposure, film advance and the like required for photographing and functions in accordance with a program shown by a flow-chart discussed later. The CPU 200 is further provided with a capacitor 210 for resetting the CPU 200, a clock generating circuit 212 for generating a clock required for proper functioning of the CPU 200, a light measuring circuit 220 for measuring the intensity of light from an object to be photographed, a DX contact 230 for transmitting a DX code formed on a film cartridge, an aperture control circuit 240 for controlling the aperture to obtain an aperture value set by the CPU 200, a shutter control circuit 250 for controlling the shutter to obtain a shutter speed set by the CPU 200, an electric motor 260 for advancing and rewinding a film loaded in the camera, a motor driving circuit 262 for controlling the motor 260, and a buzzer 270 for warning purpose. The capacitor 210 initializes the CPU 200 upon loading of the battery 120 in the camera. The light measuring circuit 220, when it has received a light measurement order from the CPU 200, measures the intensity of light sent from the object through a photographing lens and sends, upon A/D conversion of the measurement result, object brightness information to the CPU 200. The DX contact 230 is provided in a film compartment so that the DX code may be read in and transmitted as film sensitivity information to the CPU 200. The motor 260 executes shutter cocking and film advance simultaneously upon normal rotation thereof and film rewinding upon reverse rotation thereof. The motor driving circuit 262 controls the motor 260 in accordance with control signals from the CPU 200. The buzzer 270 gives warning under the control of the CPU 200 when the camera blurr may occur at the time of photographing or when the photographing is being carried out using a self-timer.

The CPU 200 has a plurality of input ports to which various switches are connected.

A main switch $SW_M$ is of an automatic return type slide switch and normally kept off unless it is operated. This switch $SW_M$ is turned on upon sliding operation thereof against biasing force of a return spring. When the main switch $SW_M$ is released, the return spring automatically returns the main switch $SW_M$ to its original position to turn it off. As described later, the CPU 200 checks the condition of the main switch $SW_M$ periodically, for example, every 250 msec so that the camera may be turned into operable state or non-operable locked state alternately whenever the main switch $SW_M$ is operated.

The light measuring switch SW1 and the release switch SW2 are turned on upon depression of the shutter release button SB by the first half stroke and by the last half stroke, respectively. An arbitrarily rewinding switch $SW_{REW}$ is of a push switch, which is depressed when the film is forcibly rewound. A sprocket signal generating switch $SW_{SP}$ is provided for detecting the rotation of a sprocket which rotates in association with traveling of the film. This switch $SW_{SP}$ will be hereinafter discussed in detail with reference to FIG. 5. A film advance detector switch $SW_W$ is turned on when one frame of the film has been completely advanced. A back cover release switch $SW_{RC}$ is turned on or off in association with opening or closing of a back-cover. An exposure mode selector switch $SW_{MODE}$ is of a push switch and normally kept off. Whenever this switch $SW_{MODE}$ is depressed, the switching of the photographing modes is done. A self-timer switch $SW_{SELF}$ is of a push switch and normally kept off. Whenever this switch $SW_{SELF}$ is depressed, the switching is done between a self-timer mode and a normal photographing mode. A high speed/silence mode selector switch $SW_{H/S}$ is of a slide switch for switching between a high speed mode and a silence mode.

One end of each of these switches is grounded while the other end thereof is connected to the corresponding input port of the CPU 200 and the voltage level of each input port is pulled up in the CPU 200. Accordingly, the other end of each switch is at a high level when the switch is off whereas the former is at a low level when the latter is on. The CPU 200 judges whether or not each switch is on by detecting the level of the other end thereof.

An LCD panel 400 is provided on an upper portion of the camera body and displays the number of film frames, the photographing mode and the like, which will be hereinafter discussed in detail with reference to FIG. 6. The LCD panel 400 has a common electrode and segment electrodes connected to a common terminal COM and segment terminals SEG of the CPU 200, respectively. The LCD panel 400 is driven by voltages divided stepwise. To this end, a bias voltage generating circuit 420 is connected to the CPU 200 s that bias voltages may be applied to the LCD panel 400 through the CPU 200.

Figure 4:
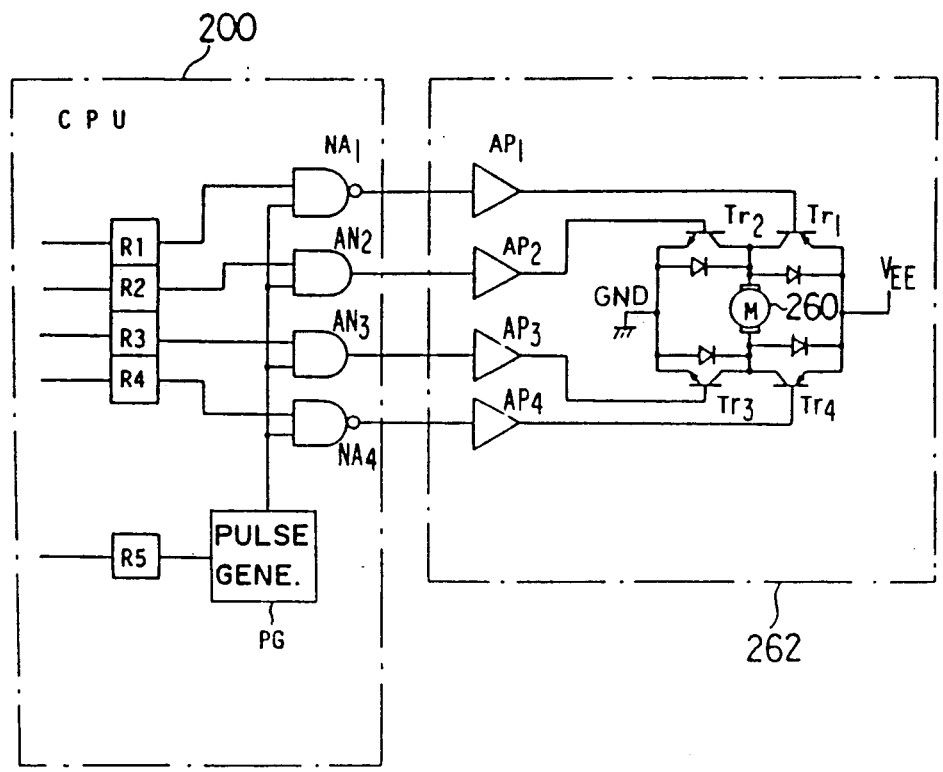
FIG. 4 is a circuit diagram of a motor driving circuit employed in the camera of FIGS. 2a and 2b.

FIG. 4 is a circuit diagram including the motor control circuit 262 for switching between the high speed mode and the silence low speed mode of the motor 260. In the motor control circuit 262, a series connection of transistors Tr1 and Tr2 and that of transistors Tr3 and Tr4 are connected in parallel with each other between the battery voltage line $V_{EE}$ and the earth line GND. The motor 260 is connected between a connection of the transistors Tr1 and Tr2 and that of the transistors Tr3 and Tr4. Each of the transistors Tr1 to Tr4 is connected, in a parallel relationship, with a diode which is provided for bypassing a current generated by a counter electromotive force of the motor 260. Outputs from buffer amplifiers AP1 to AP4 are inputted into bases of the transistors Tr1 to Tr4, respectively.

A plurality of registers R1 to R5 for controlling the motor 260 are provided in the CPU 200. Output terminals of the registers R1 and R4 ar respectively connected to input terminals of NAND gates NA1 and NA4 whereas output terminals of the registers R2 and R3 are respectively connected to input terminals of AND gates AN2 and AN3. An output of the register R5 is inputted into and controls a pulse generator PG. Outputs of the pulse generator PG are inputted into the other input terminals of the NAND gates NA1 and NA4 and AND gates AN2 and AN3. Outputs of the NAND gates NA1 and NA4 control the PNP type transistors Tr1 and Tr4 through the buffer amplifiers AP1 and AP4 whereas outputs of the AND gates AN2 and AN3 control the NPN type transistors Tr2 and Tr3 through the buffer amplifiers AP2 and AP3.

In the high speed mode, the output of the register R5 is rendered to be at a high level and the output of the pulse generator PG is kept at a high level. Accordingly, the motor 260 is controlled for its normal rotation, reverse rotation braking or stop in accordance with the conditions of the registers R1 to R4. When the motor 260 is required to rotate in the normal direction, the outputs of the registers R1 and R3 and those of the registers R2 and R4 are rendered to be at a high level and at a low level, respectively, so that only the transistors Tr1 and Tr3 may be turned on to pass current in the motor 260 in one direction. In contrast, when the motor 260 is required to rotate in the reverse direction, the outputs of the registers R1 and R3 and those of the registers R2 and R4 are rendered to be at a low level and at a high level, respectively, so that only the transistors Tr2 and Tr4 may be turned on to pass current in the motor 260 in the opposite direction. When the brakes are applied to the motor 260, the outputs of the registers R2 and R3 and those of the registers R1 and R4 are rendered to be at a high level and at a low level, respectively, so that only the transistors Tr2 and Tr3 may be turned on to short-circuit both terminals of the motor 260 through the earth line GND for application of the brakes against the rotation of inertia of the motor 260. When the motor 260 is brought to a stop, all the outputs of the registers R1 to R4 are rendered to be at a low level to turn off all the transistors Tr1 to Tr4.

In the silence mode, the output of the register R5 is rendered to be at a low level. In this event, the pulse generator PG sends a pulse output repeating high and low levels alternately. Accordingly, an effective value of the current running in the motor 260 is lowered in the normal or reverse rotation, rendering the motor 260 to rotate at a low speed and the noise level to be lowered.

Figure 5:
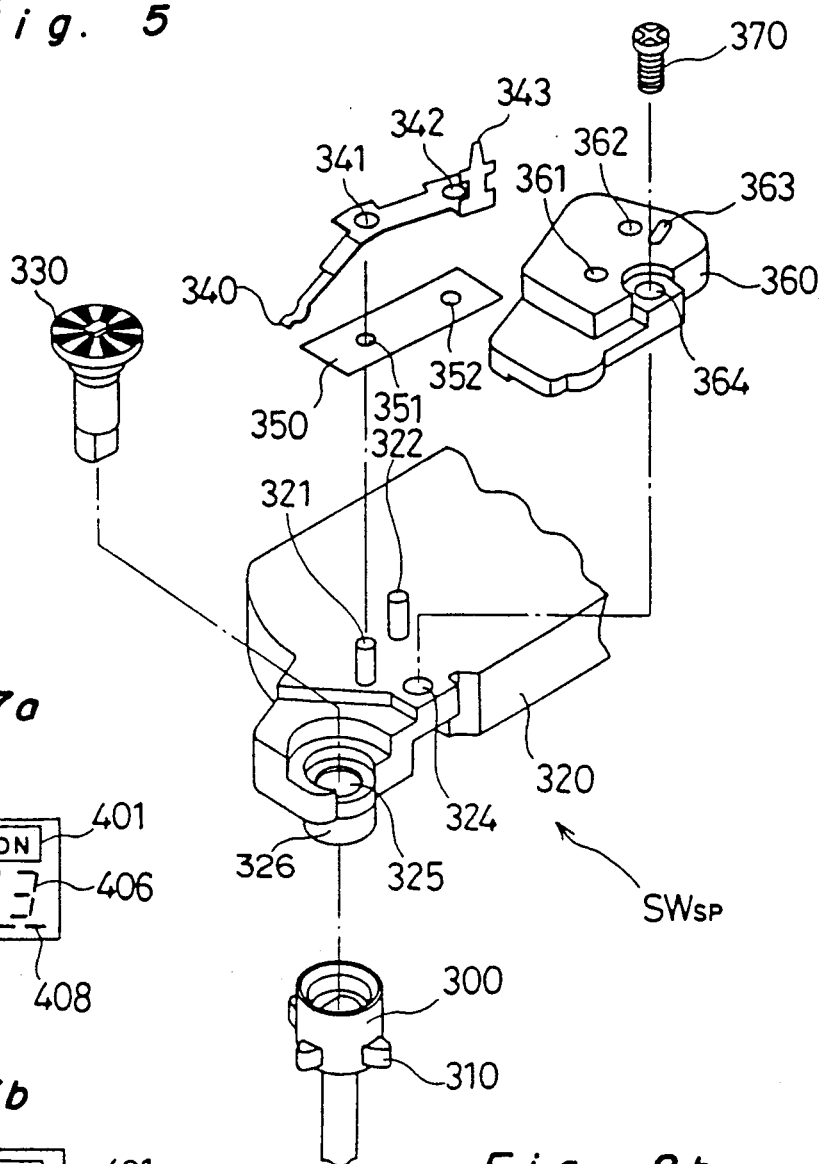
FIG. 5 is an exploded perspective view of a sprocket signal generating switch employed in the camera of FIGS. 2a and 2b.

FIG. 5 depicts the structure of the sprocket signal generating switch $SW_{SP}$ comprising a base plate 320, a film advance sprocket 300 rotatably mounted on the base plate 320, a rotary member 330 coupled with the film advance sprocket 300, a signal generating brush 340 fixedly mounted on the base plate, an insulation sheet 350 interposed between the base plate 320 and the brush 340, and a brush holder 360 for securely holding the brush 340 on the base plate 320. The film advance sprocket 300 has a plurality of teeth 310 which engages with perforations of the film to advance it. The base plate 320 is of an electrically conductive material connected to the earth line GND of the camera body internal circuit 100 and has a cylindrical projection 326, on which the sprocket 300 is rotatably mounted. The rotary member 330 is inserted into a through-opening 325 formed in the cylindrical projection 326 and is interlocked with the sprocket 300 for rotation therewith. Electrically conductive patterns and insulation patterns are alternately radially formed on the entire upper surface of the rotary member 330. The electrically conductive patterns of the rotary member 330 are grounded to the earth line GND of the camera body internal circuit 100 via the base plate 320. The signal generating brush 340 is in contact with the surface of the rotary member 330. The base plate 320 is provided with two bosses 321 and 322, which properly position the brush 340 on the base plate 320 and are coated on their surfaces with an insulation film. The insulation sheet 350 insulates the brush 340 from the base plate 320. The brush holder 360 is of an insulation material. The brush 340, the insulation sheet 350 and the brush holder 360 have respective two openings 341, 342, 351, 352, 361 and 362 into which the bosses 321 and 322 formed on the base plate 320 are inserted for positioning these members 340, 350 and 360. A terminal 343 of the brush 340 is inserted into a elongated opening 363 of the brush holder 360 and connected to one of the input ports of the CPU 200 by means of a lead wire. The brush holder 360 has a further opening 364 through which a screw 370 is tightened into a threaded hole 364 to secure the brush holder 360 along with the brush 340 and the insulation sheet 350 on the base plate 320.

When the film is advanced in order, the sprocket 300 rotates along with the rotary member 330. Consequently, the brush 340 is brought into contact with the radially formed electrically conductive patterns and insulation patterns alternately and repeats on and off with respect to the earth line. The sprocket signal generating switch $SW_{SP}$ is assembled and operates as described above.

Figure 6:
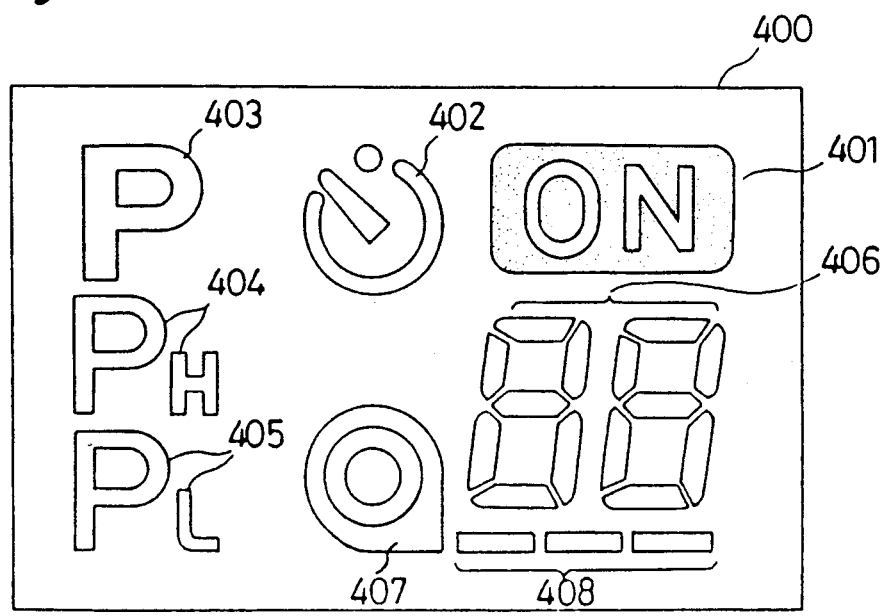
FIG. 6 is an elevational view of an LCD panel employed in the camera of FIG. 2a and 2b.

FIGS. 6 to 8 depict various visual indications of camera status on the LCD panel 400, which is provided with an on-indication 401, a self-timer mark 402, automatic exposure control mode indications 403 to 405, a film counter 406, a cartridge mark 407 and a film mark 408. The on-indication 401 indicates whether or not the power source of the camera is on i.e., the camera is in operable state. An indication segment of this indication 401 forms a negative pattern to clearly distinguish them from other indication segments. The self-timer mark 402 repeats on and off whenever the self-timer switch $SW_{SELF}$ is depressed. The camera operates in a self-timer mode only when the self-timer mark is indicated. The automatic exposure control modes consist of a standard program mode 403, a high-speed program mode 404 and a low-speed program mode 405. Whenever the exposure mode changeover switch $SW_{MODE}$ is depressed, mode marks P $P_H$ and $P_L$ are selectively indicated in turn. The cartridge mark 407 is indicated when the film cartridge is loaded within the camera. The film mark 408 is indicated when the film is advanced properly.

Figure 9:
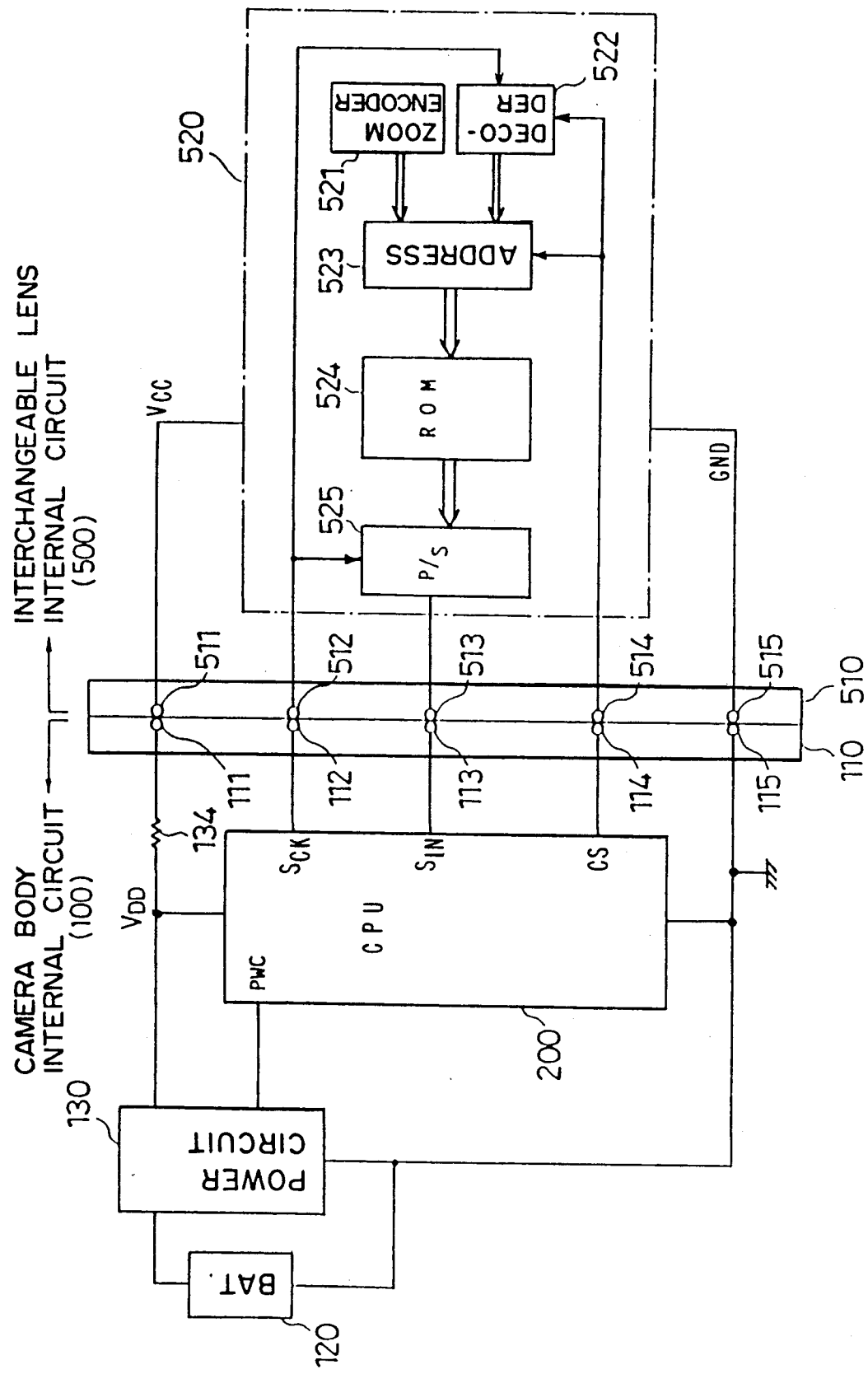
FIG. 9 is a circuit diagram indicative of a transmission circuit between the camera of FIGS. 2a and 2b and an interchangeable lens.

FIG. 9 is a circuit diagram indicative of the detail of a transmission circuit between the CPU 200 of the camera body internal circuit 100 and the interchangeable lens internal circuit 520. As clearly indicated in FIG. 9, the CPU 200 is provided with a serial clock output terminal $S_{CK}$ for serial data transmission with the circuit 520, a serial data input terminal $S_{IN}$ and a chip selector terminal CS. The serial clock output terminal $S_{CK}$ is a terminal for outputting serial clock signals used for serial data transmission between the CPU 200 and the interchangeable lens internal circuit 520. The serial data input terminal $S_{IN}$ is a terminal for inputting into the CPU 200 serial data sent from the circuit 520 in synchronism with the serial clock signals. The chip selector terminal CS is a terminal for outputting a selector signal used for serial data transmission between the CPU 200 and the circuit 520. The serial data transmission is performed when the serial clock signals are outputted from the serial clock output terminal $S_{CK}$ after the chip selector terminal CS has been rendered to be at a low level. Upon completion of the transmission, the chip selector terminal CS is rendered to be at a high level.

A group of electric contacts 110 for transmission use provided on the mounting portion of the camera body includes a plurality of electric contacts 111 to 115 while a group of electric contacts 510 for transmission use provided on the mounting portion of the interchangeable lens 500 includes a plurality of electric contacts 511 to 515. The electric power is supplied from the camera body internal circuit 100 to the interchangeable lens internal circuit 520 via the paired electric contacts 111 and 511. The stabilized voltage $V_{DD}$ of the power circuit 130 is applied to the electric contact 111 through a current limiting resistor 134, which protects the power circuit 130 when the contact 111 for power supply use is short-circuited to any other external contacts or the earth line. The serial clock signals outputted from the serial clock output terminal $S_{CK}$ are transmitted to the circuit 520 via the electric contacts 112 and 512. The serial data are inputted into the serial data input terminal $S_{IN}$ via the electric contacts 113 and 513. The selector signals outputted from the chip selector terminal CS are transmitted to the circuit 520 via the electric contacts 114 and 514. The camera body internal circuit 100 and the interchangeable lens internal circuit 520 are commonly grounded via the electric contacts 115 and 515.

The circuit 520 is provided with a zoom encoder 521, a decoder 522, an address circuit 523, a ROM 524 and a parallel/serial conversion circuit 525. When a zoom lens is mounted as the interchangeable lens 500 on the camera body, the zoom encoder 521 converts focal length information into digital information in association with the operation of the zoom ring and transmits the information to the address circuit 523. The decoder 522 counts the serial clock signals sent from the serial clock output terminal $S_{CK}$ of the CPU 200 and transmits them to the address circuit 523. The address circuit 523 receives the outputs from the zoom encoder 521 and the decoder 522 and designates an address in order to access data peculiar to the interchangeable lens 500 stored in the ROM 524. The parallel/serial conversion circuit 525 converts a parallel signal of 8 bits outputted from the ROM 524 into a serial signal of 8 bits to send as serial data to the serial data input terminal $S_{IN}$ of the CPU 200 in synchronism with the serial clock signals outputted from the serial clock output terminal $S_{CK}$.

Figure 10A:
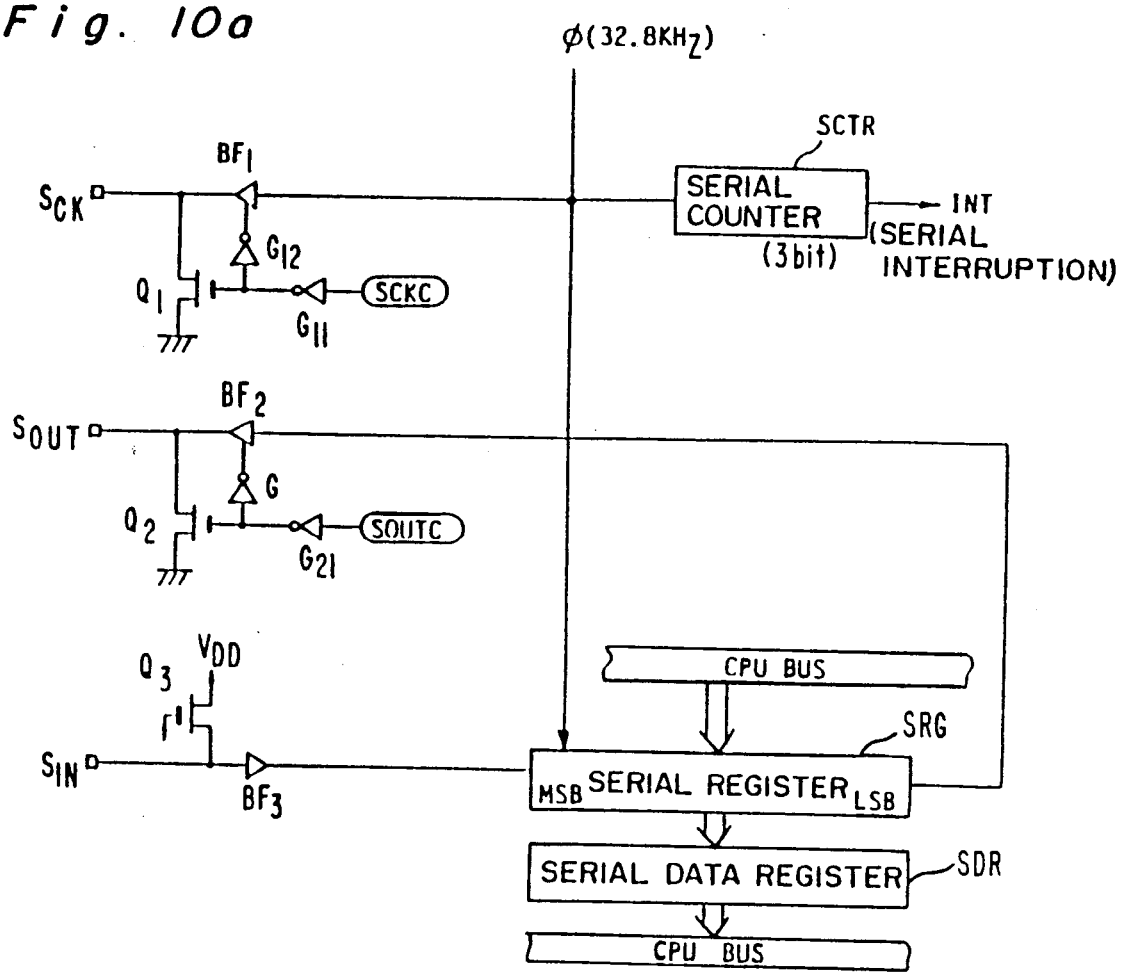
FIG. 10a is a circuit diagram indicative of an input and output circuit of a CPU employed in the camera of FIGS. 2a and 2b.
Figure 10B:
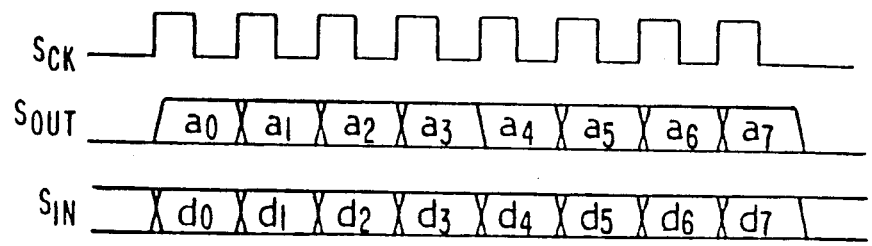

FIGS. 10a and 10b depict a circuit diagram indicative of an input and output circuit for serial data transmission use in the CPU 200 and a timing chart obtained from this circuit, respectively.

In the circuit of FIG. 10a, when a serial clock control register SCKC is set to be at a high level, an output from an inverter G11 is rendered to be at a low level and an N-channel MOS transistor Q1 constituting an output section is turned off. Simultaneously, an output from an inverter G12 is rendered to be at a high level to enable an output buffer BF1 to permit the serial data transmission. When the serial clock control register SCKC is rendered to be at a low level, the N-channel MOS transistor Q1 is turned on to lower the serial clock output terminal $S_{CK}$ in voltage level.

The serial counter SCTR is of a 3-bit counter and receives serial clock signals $\phi$ (32.8KHz) from a clock pulse generator provided in the CPU 200. When the serial counter SCTR counts eight serial clock signals $\phi$, a carry pulse is produced to cause a serial interruption in the CPU 200. The serial clock signals $\phi$ are inputted into the serial counter SCTR. At the same time, these clock signals $\phi$ are sent to an external circuit for serial data transmission via the serial clock output terminal $S_{CK}$ and also function as shift clock signals to be inputted into a serial register SRG provided in the CPU 200 so that the serial register SRG may be operated as a shift register used for serial-parallel conversion.

The serial register SRG receives serial data d0 to d7 sent from the aforementioned external circuit through the shift operation performed in synchronism with the serial clock signals $\phi$ and outputs the data to a bus line of the CPU 200 via a serial data register SDR. In contrast, parallel data set in the serial register SRG from the bus line of the CPU 200 can be sent as serial data a0 to a7 to the external circuit in synchronism with the serial clock signals $\phi$. In this embodiment, however, the function of the latter is not used when lens data are read in.

Figure 11:
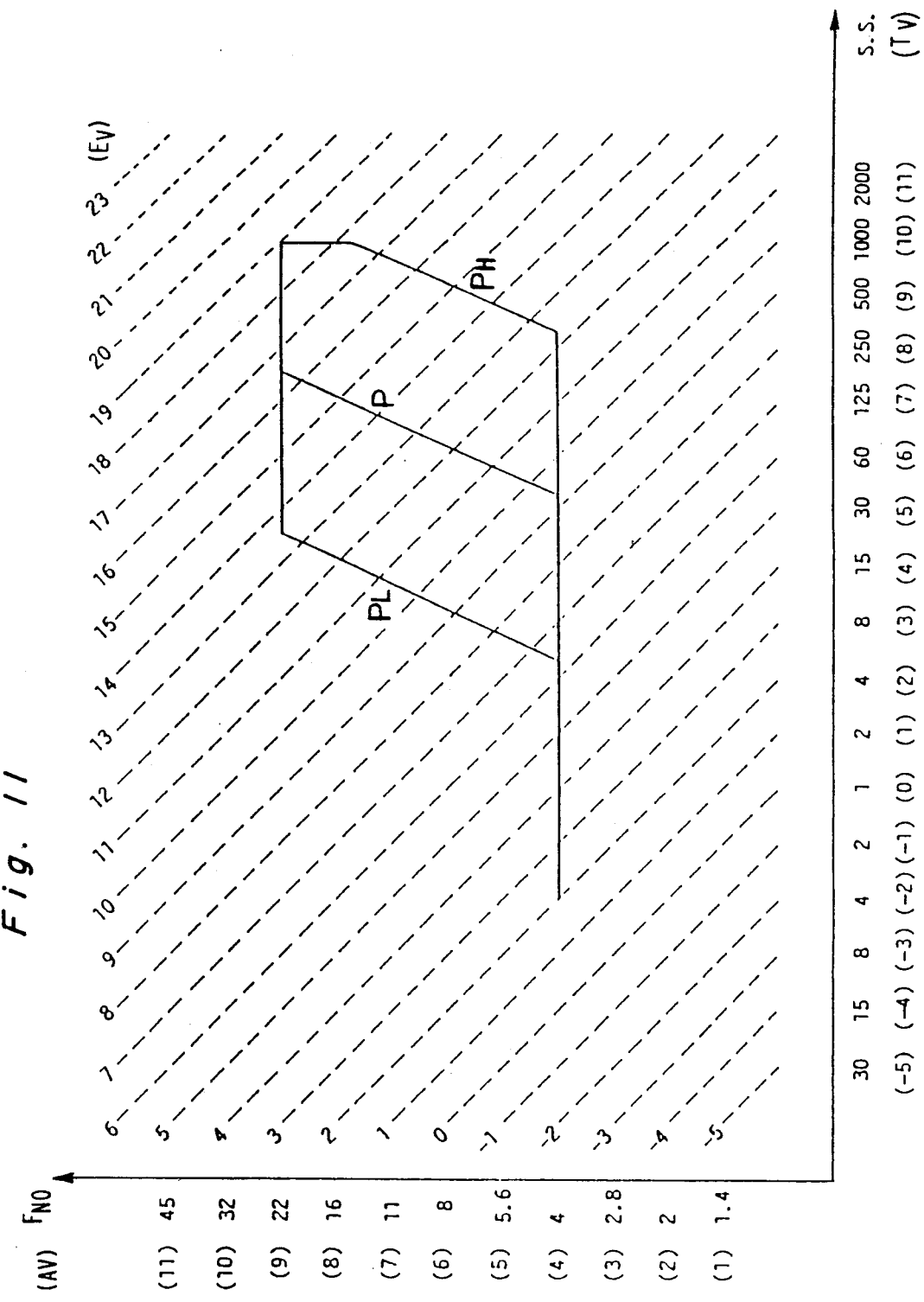
FIG. 11 is a diagram indicative of program lines employed in the camera of FIGS. 2a and 2b.

FIG. 11 is a diagram indicative of program lines for the three program modes P, $P_H$ and $P_L$ for use in this embodiment. The program lines indicate the combination of the exposure time Tv and the aperture value Av with respect to the exposure value Ev, when the aperture value Av represented by the APEX value and the exposure time Tv are taken on the ordinate and on the abscissa, respectively. In this diagram, $F_{NO}$ and S.S. signify the F-number and the shutter speed, respectively. As is clear from FIG. 11, the high speed program mode $P_H$ selects, within an effective range of the program lines, a higher shutter speed than the normal program mode P does with respect to the same exposure value Ev. Because of this, the high speed program mode $P_H$ is suitable for photographing with respect to a moving object. In contrast, the low speed program mode $P_L$ selects, within the effective range of the program lines, a lower shutter speed than the normal program mode P does with respect to the same exposure value Ev. The low speed program mode $P_L$ is a mode suitable for representing how an object is moving.

Figure 12:
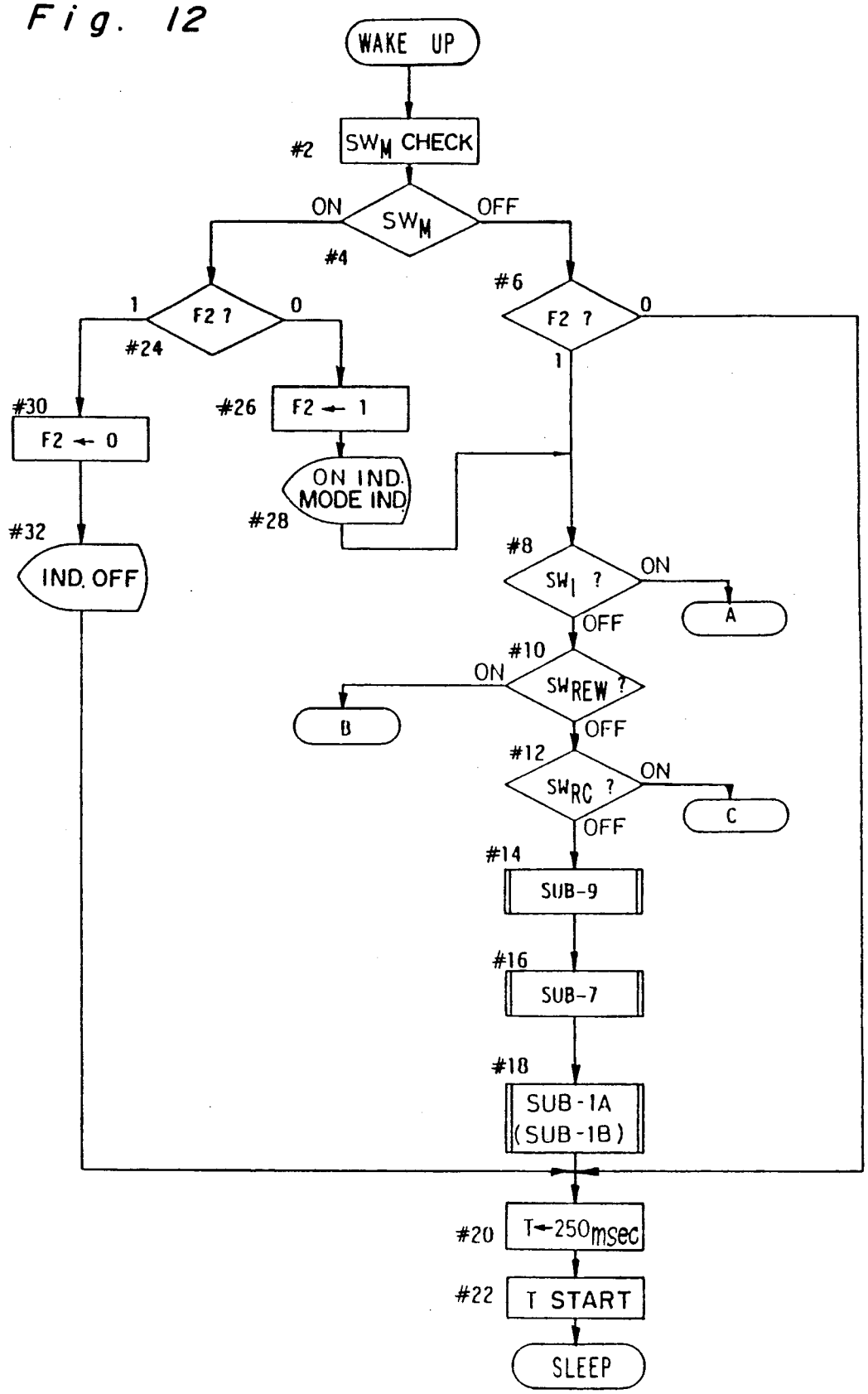
FIGS. 12 and 13 are flow-charts indicative of the main program of the CPU.

FIG. 12 is a flow-chart indicative of the main program of the CPU 200. The CPU 200 in this embodiment is provided for energy-saving with a sleep mode, in which the system clock stops sending signals so that the contents of the memory may be maintained. Timer interruption given to the CPU 200 renders the system clock to resume sending clock signals and the sleep mode is restored to the normal mode. The timer interruption is given to the CPU 200 about every 250 msec so that the procedure may start from step #2 in the normal mode.

The condition of the input port to which the main switch $SW_M$ is connected is checked at step #2, followed by step #4 at which it is judged whether or not the main switch $SW_M$ has been turned on. When the main switch $SW_M$ is not on at step #4, a main switch flag F2 is judged at step #6. This flag F2 is set to 1 when the operation of the main switch $SW_M$ renders the camera to be operable whereas the flag F2 is set to 0 when the camera is locked. When the flag F2 is 0 at step #6, this implies that the main switch $SW_M$ is not operated with the camera being set in locked state at the last wake-up time. Accordingly, it is judged that the camera is kept locked and left as it is. The procedure, therefore, proceeds directly to step #20 at which an interruption timer T is set to 250 msec for the sleep mode. The camera is then set to the sleep mode again by starting the interruption timer T at step #22. When the camera is not in use, the processing at steps #2, #4, #6, #20 and #22 is repeated at about 4 Hz.

When the main switch flag F2 is 1 at step #6, this implies that the main switch $SW_M$ is not operated with the camera being set in operable state at the last wake-up time. Accordingly, it is judged that the camera is kept in operable state and still in use. It is, therefore, judged at step #8 whether or not the light measuring switch SW1 is on to judge the condition of the shutter release button SB. When the light measuring switch SW1 is on at step #8, the procedure proceeds to step #34 shown in FIG. 13 for light measurement. When the light measuring switch SW1 is off at step #8, it is judged at step #10 whether or not the arbitrarily rewinding switch $SW_{REW}$ is on. When the film rewinding switch $SW_{REW}$ is on at step #10, the procedure proceeds to step #74 shown in FIG. 13 so that the film may be forcibly rewound in the course of the processing. When the film rewinding switch $SW_{REW}$ is off at step #10, it is judged at step #12 whether or not the back-cover switch $SW_{RC}$ is on. When the back-cover switch $SW_{RC}$ is on at step #12, the operation relating to the opening of the back-cover is done. Such operation, however, has nothing to do with the present invention, and therefore, detailed description thereof is omitted. When the back-cover switch $SW_{RC}$ is off at step #12, a subroutine SUB-9 is called to set the exposure control mode at step #14, followed by step #16 at which a subroutine SUB-7 is called to perform the self-timer mode processing. Thereafter, a subroutine SUB-1A or SUB-1B is called at step #18 to judge whether or not the lens is mounted on the camera and to display the result of judgment and the like. The interruption timer T is set at step #20 and started at step #22 to enter the sleep mode.

When a photographer intends to switch the condition of the camera, the main switch $SW_M$ is operated at step #4. Accordingly, the main switch flag F2 is checked at step #24 to judge whether the camera has been in operable state or locked state. When the flag F2 is 0 at step #24, this implies that the camera has been in locked state. The flag F2 is, therefore, rendered to be 1 at step #26 to turn the camera in operable state. Thereafter, the on-indication 401 and one of the photographing mode indications 403 to 405 are displayed on the LCD panel 400 at step #28 and the procedure proceeds to step #8 from which the operation for the normal operable-state is performed. When the flag F2 is 1 at step #24, this implies that the camera has been in operable state. The flag F2 is then rendered to be 0 at step #30 to lock the camera. Thereafter, the on-indication 401 and any photographing mode indication 403 to 405 are turned off at step #32 and the procedure proceeds to step #20 from which the operation for the normal locked condition is performed.

It is noted that although the judgment a to whether or not the lens is mounted and the display therefor are not performed when the camera is locked, the subroutine SUB-1A or SUB-1B at step #18 can be accessed, even when the camera is locked, by changing the program so that the procedure may proceeds from steps #32 and #6 to step #18. As a result, the aforementioned judgment and display therefor can be performed.

Figure 13:
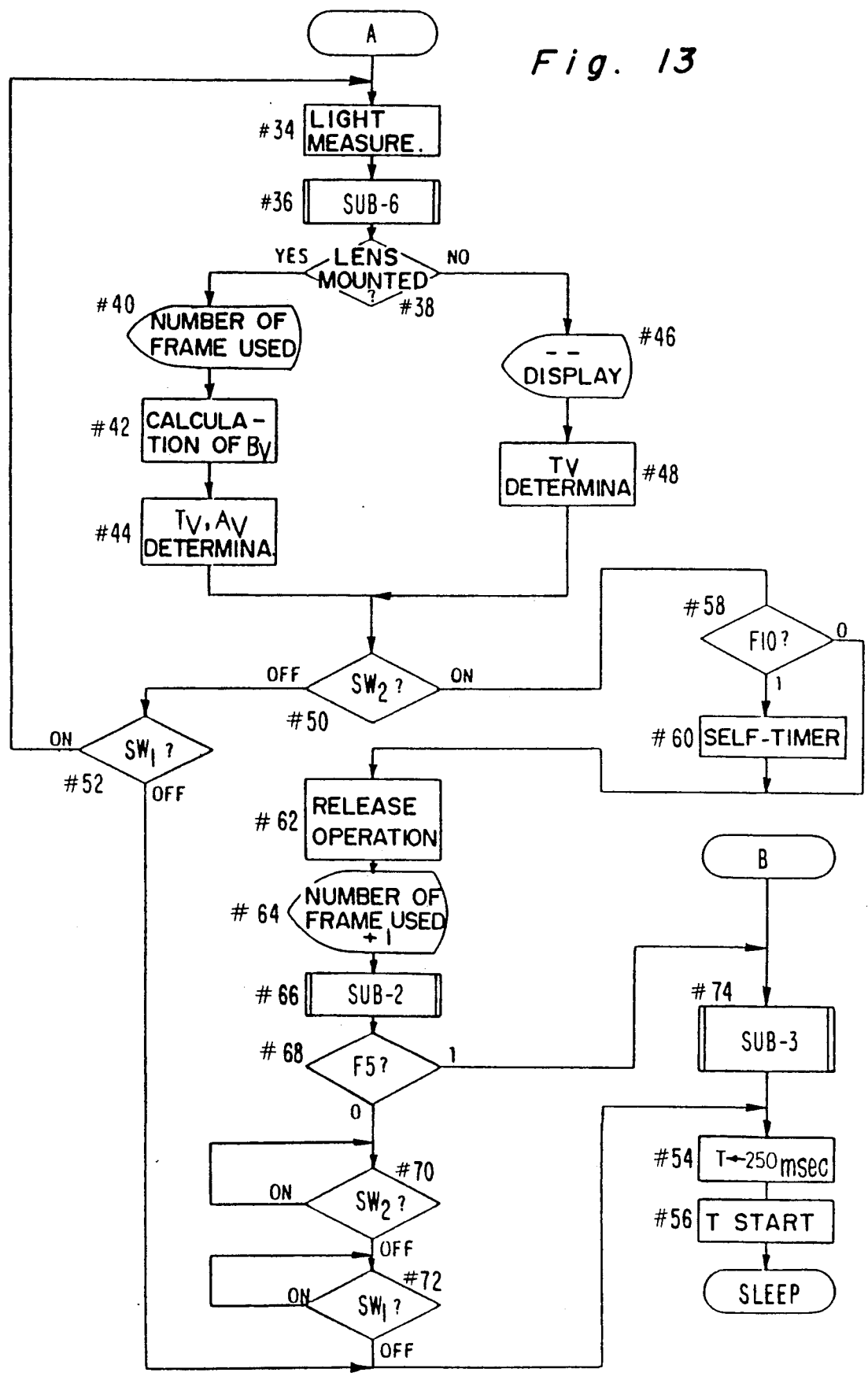

When the camera is kept in operable state and the light measuring switch SW1 is turned on at step #8, the procedure proceeds to step #34 shown in FIG. 13 to measure the brightness of an object to be photographed. More specifically, the step #34 is a step at which the CPU 200 gives a light measurement order to the light measuring circuit 220 and reads object brightness information sent from the light measuring circuit 220. At step #36, a subroutine SUB-6 is called to serially read lens data from the interchangeable lens internal circuit 520. In accordance with the result thereof, the judgment as to whether or not the lens is properly mounted is performed at step #38.

When it is judged at step #38 that the lens is properly mounted, the contents of the film counter 406 represents the number of frames used at step #40, followed by step #42 at which a measured light value is calculated on the basis of the object brightness data obtained at step #34 and the lens data obtained at step #36. The exposure value Ev is determined at step #44 on the basis of the measured light value Bv obtained at step #42 and the film sensitivity value Sv obtained from the DX contact 230. Thereafter, the shutter speed Tv and the aperture value Av are determined from the program chart in the selected program mode.

When it is judged at step #38 that the lens is not properly mounted, mounting failure is displayed at step

46. In this embodiment, 7-segment type numeral display portion of two figures is employed as the film counter 406. Accordingly, the mounting failure of the lens is indicated by the display of "--" by displaying only the central segment of each figure. Then, only the Tv value is determined at step #48 through the light measurement on the basis of an actual aperture.

Each of steps #44 and #48 is followed by step #50 at which it is judged whether or not the release switch SW2 is on. When the release switch SW2 is off at step #50, it is judged at step #52 whether the light measuring switch SW1 is on or off. When the light measuring switch SW1 is kept on at step #52, the procedure returns to step #34 to repeat the light measurement. In contrast, when the light measuring switch SW1 is off at step #52, the interruption timer T is set and started at steps #54 and #56, respectively, so that the camera may enter the sleep mode. This case results from the fact that only the light measurement has been performed without any release operation.

When the release switch SW2 is on at step #50, a self-timer mode flag F10 is judged at step #58. This flag F10 is 1 in the self-timer mode and 0 in the normal mode. When the flag F10 is 1 at step #58, the self-timer starts its inner clock set to, for example, 10 seconds. Upon completion of the operation of the self-timer, the release operation is performed at step #62. When the flag F10 is 0 at step #58, the procedure skips over step #60 to immediately initiate the release operation. The release operation such as mirror control, aperture control, shutter control or the like is performed at step #62. Upon completion of the shutter control, 1 is added to the number of frame used indicated in the film counter 406 at step #64 followed by step #66 at which a subroutine SUB-2 is called for shutter cocking and film advance. Thereafter, a film advance completion flag F5 is judged at step #68. This flag F5 becomes 1 when the exposure onto a final frame of the film has been completed and the film is subjected to tension due to incapability of further film advance whereas this flag F5 becomes 0 when the final frame of the film has not been exposed yet. When the flag F5 is 0 at step #68, the procedure proceeds to step #54 after the release switch SW2 and the light measuring switch SW1 have been turned off at steps #70 and #72, respectively. The interruption timer T is set at step #54 and started at step #56, and thereafter, the camera enters the sleep mode. When the flag F5 is 1 at step #68, the final frame of the film has been exposed and the film is subjected to tension. Accordingly, the subroutine SUB-3 for automatically rewinding the film is called at step #74 and the camera enters the sleep mode through steps #54 and #56. Even when it is not judged that the film advance completion flag F5 is 1, the subroutine SUB-3 is called at step #74, when the arbitrarily rewinding switch SW$_{REW}$ is judged to be on at step #10, so that the film may be rewound.

Figure 14A:
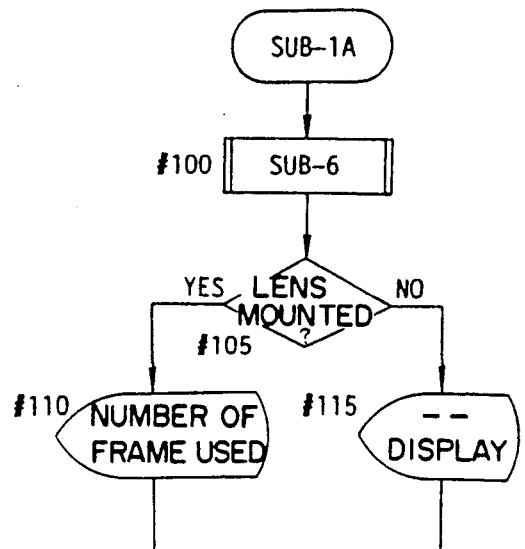
FIGS. 14a and 14b are flow-charts each indicative of a subroutine for judgment of the mounting condition of a lens and for display thereof.

FIG. 14a is a flow-chart indicative of the subroutine SUB-1A for judgment as to whether or not the lens is properly mounted on the camera body and for display thereof. The subroutine SUB-1A is called at step #18 in the main program. When this subroutine SUB-1A is called, a plurality of lens data are serially read out of the interchangeable lens internal circuit 520 in a subroutine SUB-6 at step #100. In accordance with read lens data, it is judged at step #105 whether or not the lens is properly mounted. This judgment is done by checking the contents of the first lens data which have been read by the CPU 200 from the interchangeable lens 500 through the serial data transmission. More specifically, in plural bites of serial data, the first 8-bit data are fixed data determined in advance for checking the mounting condition of the lens and represented by, for example, "10101010" in the binary code. When the lens is properly mounted, the first data read by the CPU 200 are naturally "10101010". However, when the lens is not mounted or improperly mounted, first data do not coincide with the predetermined data. Upon detection of this the improper mounting of the lens is detected.

Figure 7A:
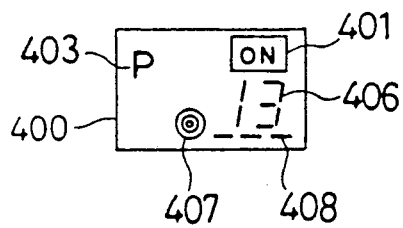
FIGS. 7a, 7b, 8a and 8b are views of the LCD panel of FIG. 6 explanatory of various visual indications of camera status.
Figure 7B:
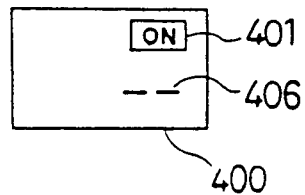

When the proper mounting of the lens is detected at step #105, the film counter 406 indicates at step #110 the number of frames used, as shown in FIG. 7a. The procedure then returns to the main program. In contrast, when the improper mounting of the lens is detected at step #105, the mounting failure is given at step #115, as shown in FIG. 7b, and the procedure returns to the main program. As described so far, the mounting failure "--" is given by displaying only the central segment of each figure in the numeral display portion.

Figure 8A:
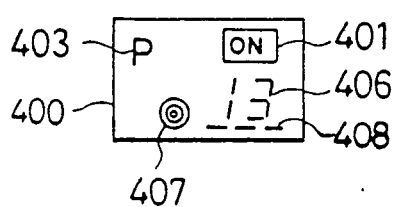
Figure 14B:
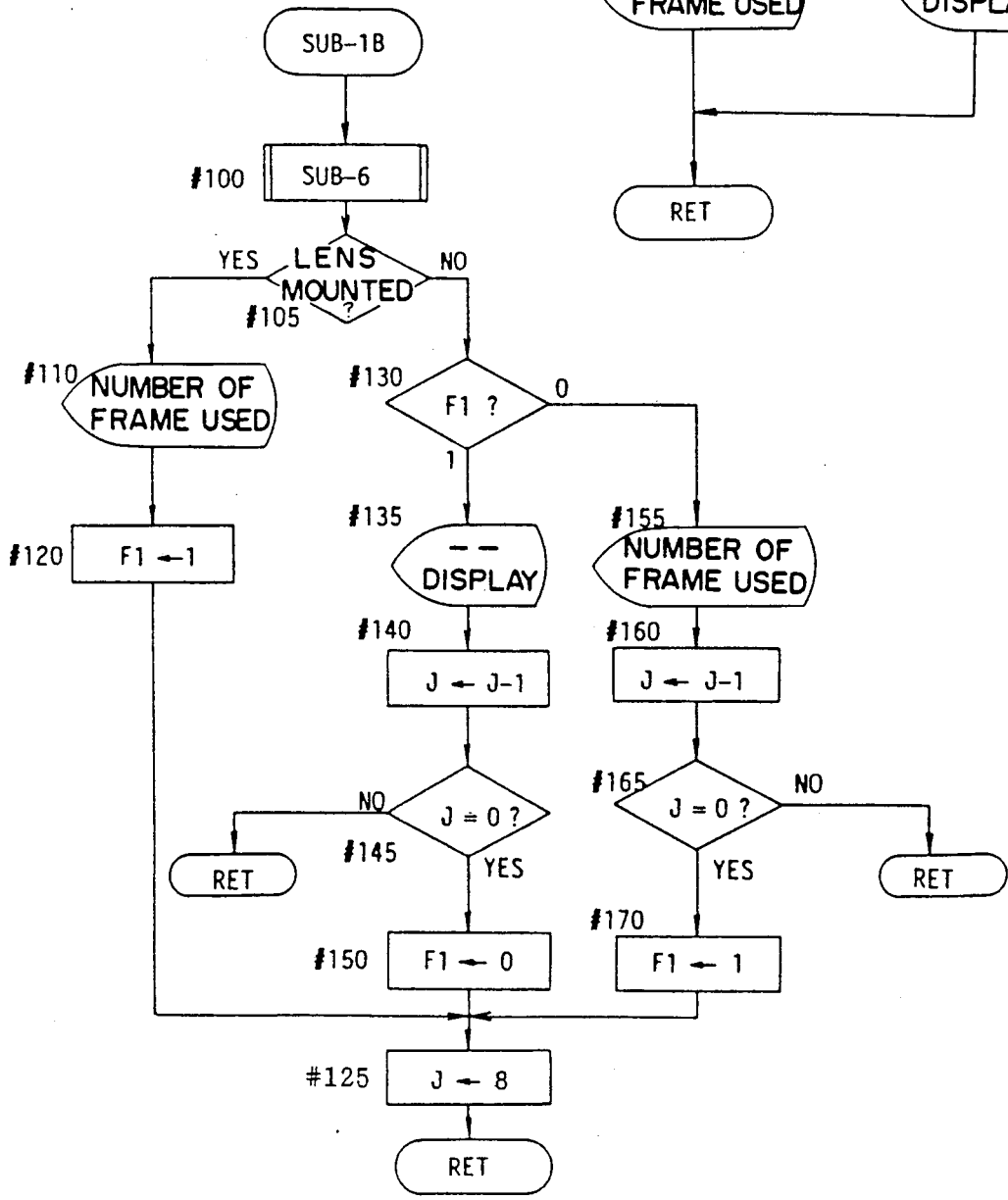

FIG. 14b is a flow-chart indicative of another subroutine SUB-1B for judgment of the mounting condition of the lens and for display thereof. The subroutine SUB-1A at step #18 in the main program may be replaced by this subroutine SUB-1B. When the subroutine SUB-1B is called, serial lens data are serially read out of the circuit 520 in the subroutine SUB-6 at step #100. In accordance with read lens data, it is judged at step #105 whether or not the lens is properly mounted. When it is judged at step #105 that the lens is properly mounted, the film counter 406 indicates at step #110 the number of frames used, as shown in FIG. 8a. The flag F1 is set at step #120 and 8 is set to a variable J at step #125. Thereafter, the procedure returns to the main program. The flag F1 is a flag for switching the display when the lens is improperly mounted. When this flag F1 is 1, the film counter 406 indicates the display "--" at the time of improper mounting of the lens. When this flag F1 is 0, the film counter 406 indicates the number of frames used, notwithstanding the improper mounting of the lens. Even when the lens is properly mounted at present, the flag F1 is set to 1 so that the display "--" may be given immediately after the lens would have been brought into the improper mounting condition. The variable J is a counter for determining the periodic time appropriate for switching between the display "--" and the number of frames used in the film counter 406 at the time of improper mounting of the lens. In this embodiment, this variable J is initially set to 8.

When it is judged at step #105 that the lens is not properly mounted, the flag F1 for switching the display is judged at step #130. When the flag F1 is set to 1 at step #130, the film counter 106 performs the display "--" at step #135 to inform a photographer of the improper mounting of the lens. Thereafter, 1 is subtracted from the counter J at step #140 and it is judged at step #145 whether or not the counter J has become equal to 0. When the counter J is not equal to 0 at step #145, procedure returns to the main program to enter the sleep mode. If the improper mounting condition of the lens continues thereafter, the procedure returns to the normal mode from the sleep mode about every 250 msec and passes steps #135 and #140. When the procedure has passed step #140 eight times i.e., when about 2 seconds has elapsed, it is judged that the counter has become equal to 0 at step #145. In this event, the flag F1 for switching the display is rendered to be 0 at step

Figure 8B:
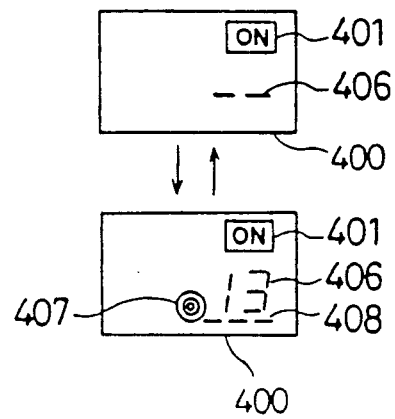

150 and the counter J is set to the initial number 8 at step #125. The procedure then returns to the main program. Accordingly, when the procedure passes step #130 again, the film counter 406 informs the photographer of the number of frames used at step #155 because the flag F1 is judged to be 0. Subsequently, 1 is subtracted from the counter J at step #160 and it is judged at step #165 whether or not the counter J has become equal to 0. When the counter J is not equal to 0 at step #165, the procedure returns to the main program to enter the sleep mode. If the improper mounting of the lens continues thereafter, the sleep mode is switched to the normal mode about every 250 msec and the procedure passes steps #155 and #160. When the procedure has passed step #160 eight times i.e., when about 2 seconds has this event, the flag F1 for switching the display is rendered to be 1 at step #170 and the counter J is set to the initial number 8 at step #125. The procedure then returns to the main program and the same procedure is repeated thereafter so that the film counter 406 may display the mounting failure "--" and the number of frames used alternately at a period of about 2 seconds, as shown in FIG. 8b. Accordingly, the photographer can know the number of frames used even at the time of improper mounting of the lens.

Figure 15:
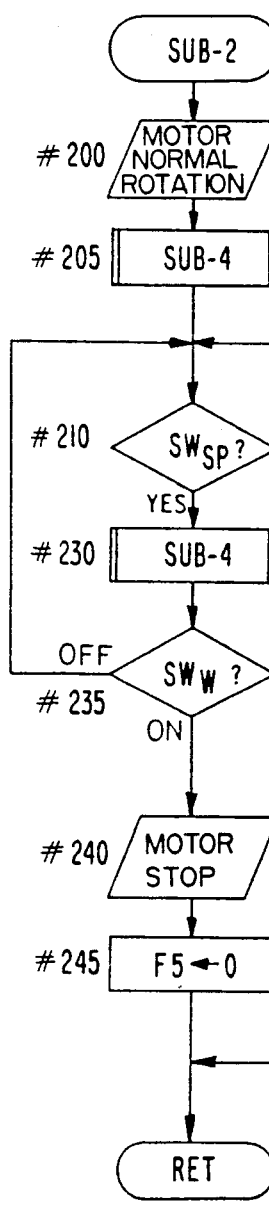
FIG. 15 is a flow-chart indicative of a subroutine for shutter charge and film advance.

FIG. 15 is a flow-chart indicative of a subroutine SUB-2 for the shutter cocking and the film advance, which is called at step #66 in the main program. In this subroutine SUB-2, the motor 260 is supplied with electricity to rotate normally at step #200 so that the shutter cocking and the film advance may be initiated. As described above, the motor 260 is so mechanically constituted as to perform, upon normal rotation thereof, both the shutter cocking and the film advance simultaneously. At step #205, a timer is reset and started which is provided for determining a periodic time appropriate to detect a sprocket signal. It is detected at step #210 whether or not the sprocket signal detector switch SW$_{SP}$ produces the sprocket signal. When no sprocket signal is produced, the procedure proceeds to step #215 at which it is judged whether or not the timer which has been reset and started at step #205 is up. Unless the timer is up, the procedure returns to step #210. If no sprocket signal is produced, the procedure repeats the judgment of step 210 and that of step #215. When the timer is up at step #215 without any sprocket signal, it is judged that the film has been completely advanced to the final frame or that some abnormality has taken place in feeding the film. As a result, after the motor 260 has been brought to a stop at step #220 and the flag F5 has been rendered to be 1 at step #225, the procedure returns to the main program. As described so far, the flag F5 is provided for indicating the completion of film advance. This flag F5 is 0 when the film can normally be fed whereas this flag is 1 when the film cannot be fed any longer.

When the judgments at steps #210 and #215 are repeated and when it is judged that the sprocket signal has been produced at step #210 before the timer is up at step #215, the timer for determining the periodic time for detection of sprocket signal is again reset and started at step #230. It is judged at step #235 whether or not the film advance detector switch SW$_W$ is on. When this switch SW$_W$ is judged to be off at step #235, it is judged that the film advance by one frame has not been completed yet. In this case, the procedure returns to the judgment of step #210 to continue the film advance. In contrast, when the switch SW$_W$ is on at step #235, it is judged that the film has been completely advanced by one frame. In this event, the motor 260 is brought to a stop at step #240 and the film advance completion flag F5 is rendered to be 0 at step #245. The procedure then returns to the main program. In this embodiment, the sprocket signals are produced eight times until the film advance by one frame has been completed. The procedure proceeds to steps #240 and #245 after having passed a loop at steps #210, #230 and #235.

Figure 16:
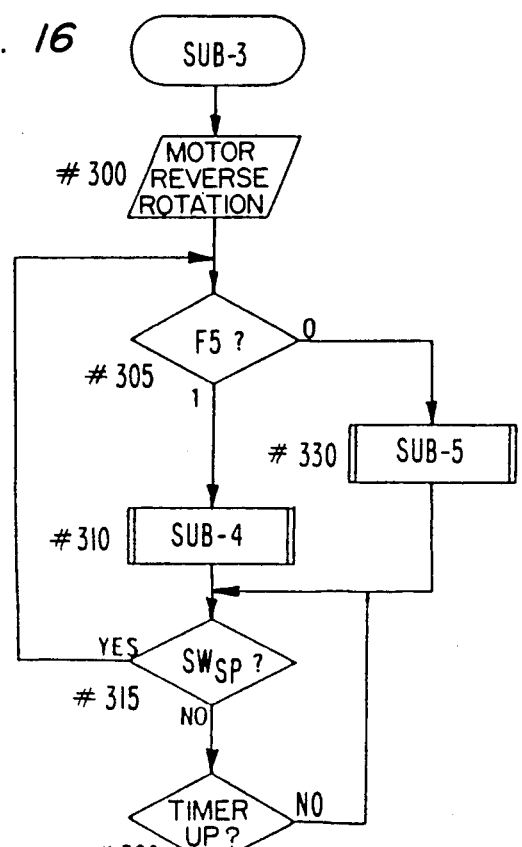
FIG. 16 is a flow-chart indicative of a subroutine required for rewinding the film.

FIG. 16 indicates a subroutine SUB-3 required for rewinding the film, which is called at step #74 in the main program. In the subroutine SUB-3, the motor 260 is so charged with electricity as to be reversed at step #300 and begins to rewind the film. As described above, this motor 260 is mechanically constituted to rewind the film upon reverse rotation thereof. Subsequently, the film advance completion flag F5 is judged at step #305. When the flag F5 is 1 at step #305, it is judged that the film has been completely advanced or that some abnormality has taken place in feeding the film. In this case, a timer to be used for automatically rewinding the film is reset and started at step #310. When the flag F5 is 0 at step #305, it is judged that the arbitrarily rewinding switch SW$_{REW}$ has been operated, though the film advance has not been completed yet. Accordingly, a timer to be used for arbitrarily rewinding the film is reset and started at step #330. It is noted that the timer used for automatically rewinding the film is set shorter than that used for arbitrarily rewinding the film. This is due to the fact that the film is subjected to tension at the time of automatically rewinding the film. Accordingly, upon commencement of the film rewinding, the sprocket immediately rotates therewith to produce the sprocket signals, thus enabling the periodic time for detection of these signals to be shortened. On the other hand, when the operator arbitrarily rewinds the film before all of the frames have been completely exposed, the film is not subjected to tension and is considered to be loose in the film cartridge. Accordingly, the commencement of the film rewinding tightens the film inside the film cartridge for a while, and thereafter, the film outside the cartridge is accommodated into the cartridge. In such a case, the commencement of the film rewinding does not always immediately produce the sprocket signals. Because of this, the necessity arises to lengthen the periodic time for detection of the sprocket signals.

It is judged at step #315 whether or not the sprocket signal generating switch SW$_{SP}$ generates a sprocket signal. When no sprocket signal is generated, the procedure proceeds to step #320, at which it is judged whether or not the timer is up which has been reset and started at steps #310 or #330. When the timer is not up, the procedure returns to the judgment of step #315. The judgments of steps #315 and #320 are repeated without any sprocket signal. When it is judged at step #315 that the sprocket signal has been generated, the procedure returns to step #305 at which the timer to be used for determining the periodic time for detection of the sprocket signals is again reset and started at step #310 or #330 in accordance with the value of the flag F5. When the timer is up at step #320 without any sprocket signal, it is judged that the film has been completely rewound to the end or that some abnormality has taken place in feeding the film. Thereafter, the motor 260 is brought to a stop at step #325 and the procedure returns to the main program.

Figure 17:
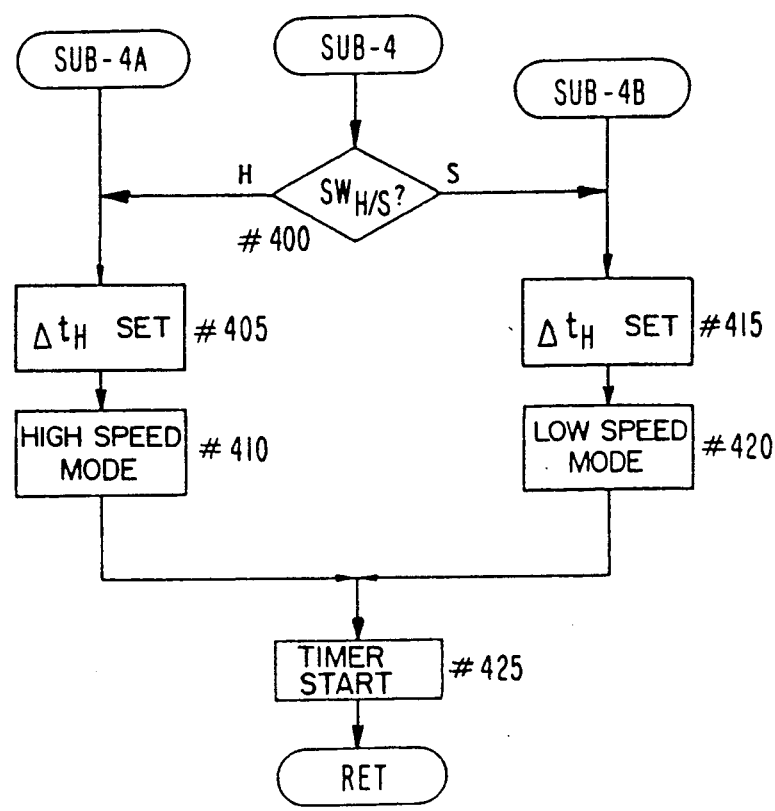
FIG. 17 is a flow-chart indicative of a subroutine for resetting and starting a timer which determines periodic time for detection of sprocket signals at the time of automatically advancing or rewinding the film.

FIG. 17 indicates a subroutine SUB-4 for resetting and starting the timer which determines the periodic time for detection of the sprocket signals at the time of automatically advancing or rewinding the film. This subroutine SUB-4 is called at steps #205 and #230 in the subroutine SUB-2 for advancing the film or at step #310 in the subroutine SUB-3 for rewinding the film. In the subroutine SUB-4, it is judged at step #400 whether the high speed mode or the silence mode is set by the mode selector switch $SW_{H/S}$. When the mode selector switch $SW_{H/S}$ selects the high speed mode, the motor 260 rotates at a high speed, rendering intervals of the generated sprocket signals to be shortened. In accordance therewith, it is required to set shorter the periodic time for detection of the sprocket signals. On the other hand, when the mode selector switch $SW_{H/S}$ selects the silence mode, the motor 260 rotates quietly at a low speed, rendering the intervals of the generated sprocket signals to be lengthened. Accordingly, it is required to set longer the periodic time for detection of the sprocket signals.

Therefore, when the mode selector switch $SW_{H/S}$ sets the high speed mode at step #400, a short periodic time $\Delta t_H$, for example, 300 msec is initially set to the timer at step #405 so that the motor 260 may be set to the high speed mode at step #410. On the other hand, when the mode selector switch $SW_{H/S}$ sets the silence mode at step #400, a long periodic time $\Delta t_S$, for example, 1 sec is initially set to the timer at step #415 so that the motor 260 may be set to the low speed mode at step #420. In either case, the timer is started at step #425 and the procedure returns to the main program.

Figure 18:
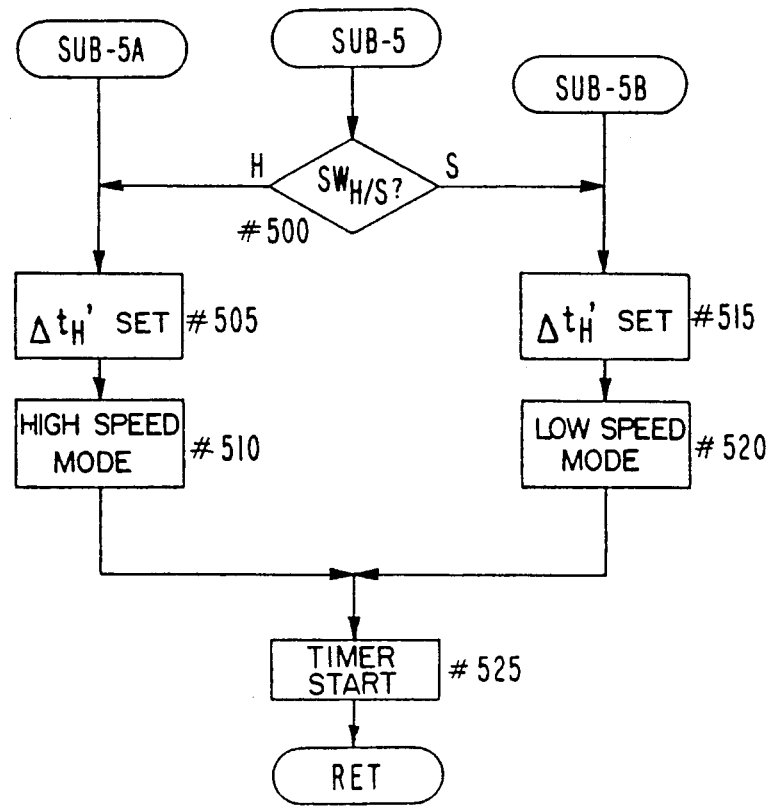
FIG. 18 is a flow-chart indicative of a subroutine for resetting and starting a timer which determines periodic time for detection of sprocket signals when the film is rewound enroute.

FIG. 18 indicates a subroutine SUB-5 for resetting and starting the timer which determines the periodic time for detection of the sprocket signals when the film is rewound enroute. This subroutine SUB-5 is called at step #330 in the subroutine SUB-3 for rewinding the film. The processing carried out at steps #500 to #525 in the subroutine SUB-5 is the same as that carried out at steps #400 to #425 in the subroutine SUB-4. However, it should be noted that periodic times $\Delta t_H'$ and $\Delta t_S'$ to be set at steps #505 and #515 are $\alpha$ times ($\alpha > 1$, for example, $\alpha = 3$) greater than the periodic times $\Delta t_H$ and $\Delta t_S$ set at steps #405 and #415. This is due to the fact that the film is not subjected to tension and is considered to be loose in the film cartridge when the film is rewound enroute in both the high speed mode and the silence mode. Accordingly, it is required to lengthen the periodic time for detection as compared with the case in which the film is automatically rewound.

Figure 19A:
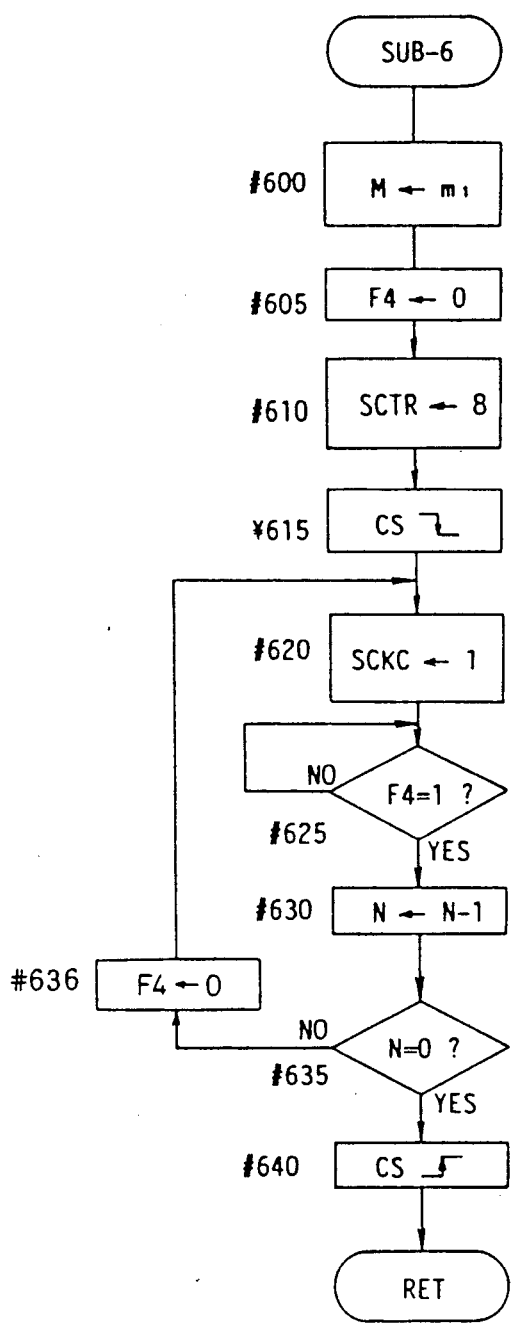
FIG. 19a is a flow-chart indicative of a subroutine for reading lens data.

FIG. 19a indicates a subroutine SUB-6 for reading lens data, which is called at step #36 in the main program or at step #100 in the subroutine SUB-1A or SUB-1B. In the subroutine SUB-6, the first address ml for storing therein serial data is initially set at step #600 in an address pointer M of the RAM in the CPU 200. A serial data transmission completion flag F4 is then reset at step #605. The flag F4 is rendered to be 1 when the serial data transmission has been completed by one bite between the CPU 200 and the interchangeable lens internal circuit 520 whereas the flag F4 is rendered to be 0 when the serial data transmission has not been completed yet. An initial value 8 is set to the serial counter SCTR at step #610 so that the serial counter SCTR can count serial clock signals by one bite, followed by step #615 at which the chip selector terminal CS is rendered to be at a low level. Consequently, the circuit 520 is selected and parallel data of eight bits are read out of the ROM 524 and converted into serial data by the parallel/serial conversion circuit 525. Thereafter, each one bit of the serial data is inputted into the CPU 200 and stored in the serial register SRG in the CPU 200 whenever each one clock signal is inputted into the circuit 520 through the serial clock output terminal $S_{CK}$ of the CPU 200. The serial clock control register SCKC is rendered to be 1 at step #620, thereby outputting the serial clock signals from the serial clock terminal $S_{CK}$. The serial data transmission completion flag F4 is judged at step #625. The procedure repeats the judgment at step #625 unless the flag F4 is 1. Since the flag F4 is 0 immediately after the commencement of the serial data transmission, the judgment at step #625 is repeated until the flag F4 becomes 1. The CPU 200 accommodates the serial counter SCTR for counting the number of serial clock signals given to the circuit 520. whenever each one clock signal is given to the circuit 520, 1 is reduced from the serial counter SCTR. Since this serial counter SCTR has initially been set to 8 at step #610, eight clock signals given to the circuit 520 render the serial counter SCTR to be 0. In this event, the serial interruption is applied to the CPU 200.

Figure 19B:
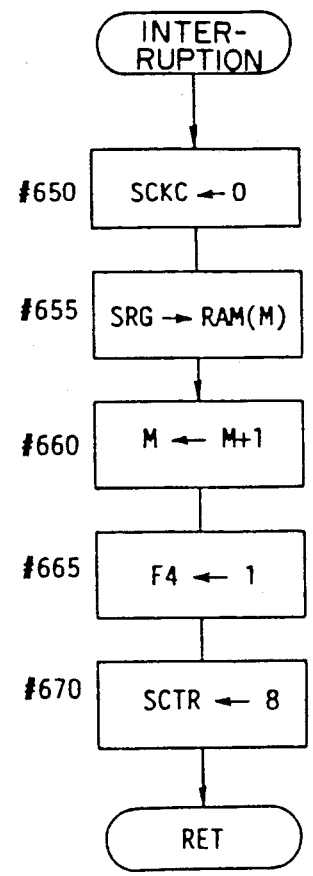
FIG. 19b is a flow-chart indicative of a subroutine for serial interruption.

FIG. 19b represents the contents of the serial interruption. The serial clock control register SCKC is rendered to be 0 at step #650 to stop the output of the clock signals, followed by step #655 at which the serial data of 8 bits stored in the serial register SRG are transferred as parallel data to an address designated by the address pointer M of the RAM in the CPU 200. Subsequently, 1 is added to the address pointer M at step #660 and the flag F4 is rendered to be 1 at step #665. The serial counter SCTR is again set to the initial value 8 at step #670 and the procedure returns to step #625 at which the serial interruption has been given.

The serial data transmission completion flag F1 is 1 at step #625, and therefore, the procedure proceeds to step #630 at which 1 is reduced from a serial data counter N, which is a counter for designating the number of serial data of one bite to be read and is set in advance before the subroutine SUB-6 is called. Only data of the first one bite are read at step #100 in the subroutine SUB-1A or SUB-1B for detecting the mounting condition of the lens. Accordingly, the subroutine SUB-6 is called by setting the counter N to the initial value 1. Furthermore, the subroutine SUB-6 is called at step #36 in the main program by initially setting the necessary number of data into the serial data counter N, since various kinds of lens data are used at subsequent step #42.

It is judged at step #635 whether or not the serial data counter N has been rendered to be 0. Unless the serial data counter N is 0, the flag F4 is rendered to be 0 at step #636 and the procedure returns to step #620 so that the serial data of one bite may be again inputted. When the serial data counter N is 0 at step #635 which implies that the serial data in the necessary number of bite have been inputted, the data transmission with the circuit 520 is completed by rendering the chip selector terminal CS to be at a high level at step #640, and thereafter, the procedure returns to the main program.

Figure 20:
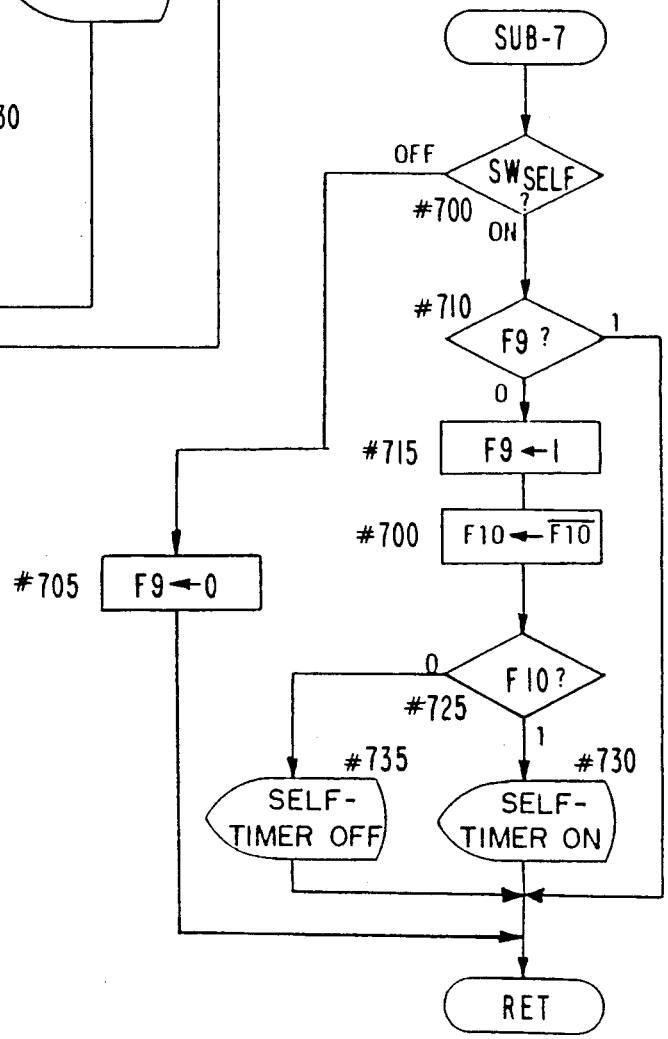
FIG. 20 is a flow-chart indicative of a subroutine for establishing a self-timer mode.

FIG. 20 represents a subroutine SUB-7 for establishing the self-timer mode, which is called at step #16 in the main program. In this subroutine SUB-7, it is judged at step #700 whether the self-timer switch $SW_{SELF}$ is on or off. When the self-timer switch $SW_{SELF}$ is off at step #700, a self timer switch flag F9 is rendered to be 0 at step #705 and the procedure returns to the main program. The flag F9 is rendered to be 1 when the self-timer switch $SW_{SELF}$ is on whereas the former is rendered to be 0 when the latter is off. When the self-timer switch $SW_{SELF}$ is on at step #700, the flag F9 is judged at step #710. When the flag F9 is 1 at step #710 which implies that the self-timer switch $SW_{SELF}$ has been and is still on, the procedure returns to the main program without switching between the self-timer mode and the normal mode. When the flag F9 is 0 at step #710 which implies that the self-timer switch $SW_{SELF}$ had been off, The flag F9 is rendered to be 1 at step #715 and a photographing mode selector flag F10 is reversed at step #720. The flag F10 is 1 in the self-timer mode whereas the flag F10 is 0 in the normal mode. This flag F10 is judged at step #725. When the flag F10 is 1 at step #725 which implies the self-timer mode, the self-timer mark 402 on the LCD panel is turned on at step #730 and the procedure returns to the main program. In contrast, when the flag F10 is 0 at step #725 which implies the normal mode, the self-timer mark 402 on the LCD panel 400 is turned off at step #735 and the procedure returns to the main program.

Figure 21:
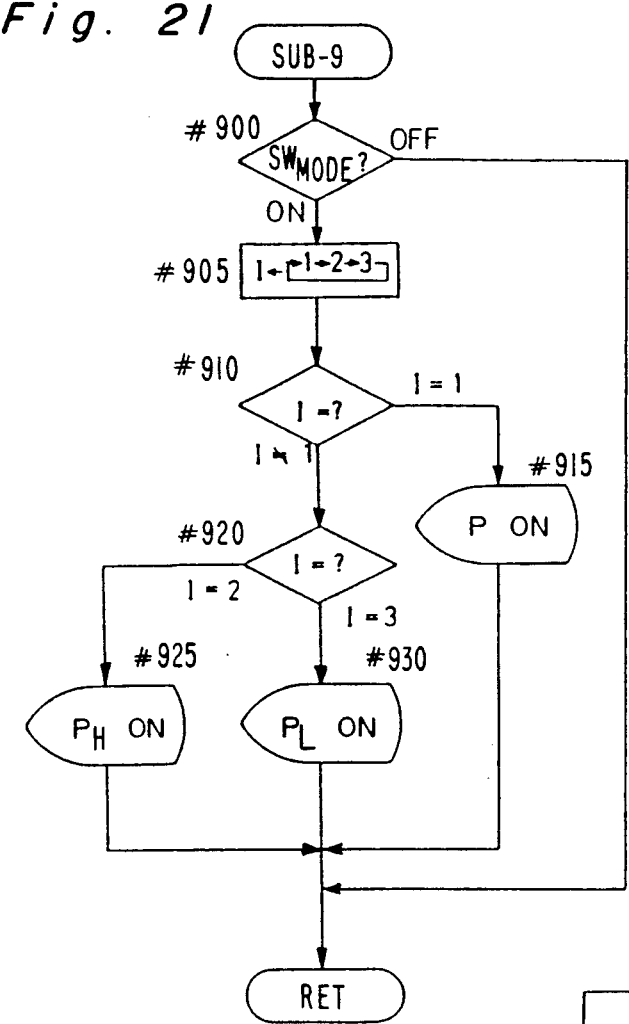
FIG. 21 is a flow-chart indicative of a subroutine for establishing an exposure mode.

FIG. 21 represents a subroutine SUB-9 for establishing the exposure mode, which is called at step #14 in the main program. In the subroutine SUB-9, it is judged at step #900 whether the exposure mode selector switch $SW_{MODE}$ is on or off. When the exposure mode selector switch $SW_{MODE}$ is on at step #900, 1 is added to a mode counter I at step #905. This mode counter I circulates in such a way as 1→2→3→1 .... When the mode counter I equals 1 at step #910, it is judged that the normal program mode has been selected and the display 403 for the normal program mode on the LCD panel 400 is turned on at step #915. Thereafter, the procedure returns to the main program. When the mode counter I does not equal 1 at step #910, it is judged that either one of the high speed program mode and the low speed program mode has been selected. When the mode counter I equals 2 at step #920 which implies the selection of the high speed program mode, the high speed program mode display 404 on the LCD panel 400 is turned on at step #925 and the procedure returns to the main program. When the mode counter I equals 3 at step #920 which implies the selection of the low speed program mode, the low speed program mode display 405 on the LCD panel 400 is turned on at step #930 and the procedure returns to the main program.

It is noted that at step #44 in the main program, the program mode set at present is judged by reading the mode counter I.

In this embodiment, since no flag is used for storing the condition of the exposure mode selector switch $SW_{MODE}$, the exposure mode is changed in the order described above about every 250 msec when the exposure mode selector switch $SW_{MODE}$ continues to be depressed. Naturally, the mode may be changed one by one whenever the selector switch $SW_{MODE}$ is depressed, by providing the same flag as the flag F9 in the aforementioned subroutine SUB-7.

Two modifications of the subroutine SUB-3 for rewinding the film will be hereinafter discussed. In these modifications, the selector switch $SW_{H/S}$ for selecting between the high speed mode and the silence mode is not provided.

Figure 22:
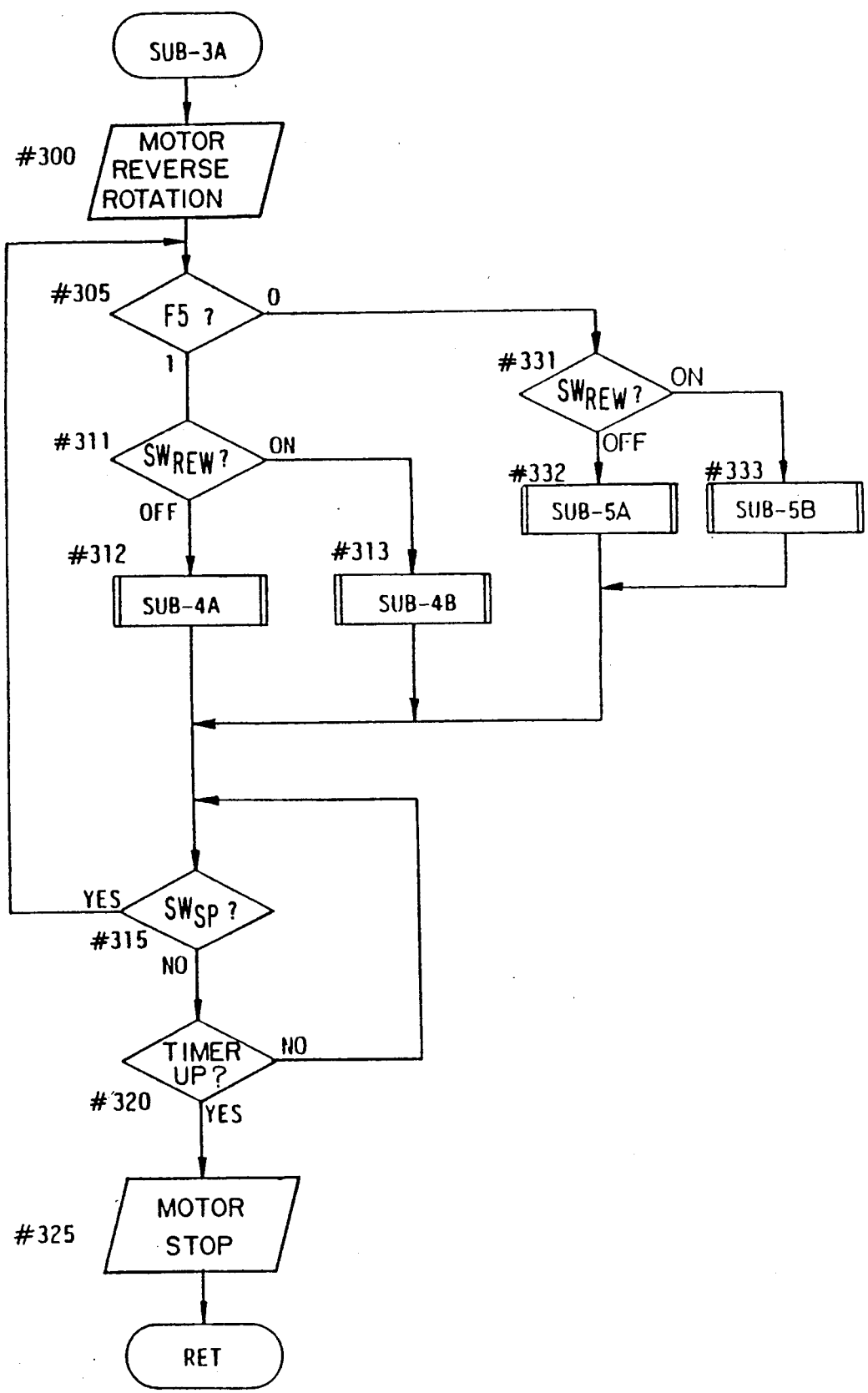
FIG. 22 is a flow-chart similar to FIG. 16, which particularly shows a modification thereof.

FIG. 22 represents a modification SUB-3A of the subroutine SUB-3. In this modification SUB-3A, steps #311 to #313 and steps #331 to #333 are respectively used in place of step #310 and #330 in the subroutine SUB-3.

It is judged at step #311 whether the arbitrarily rewinding switch $SW_{REW}$ is on or off. When this switch $SW_{REW}$ is off at step #311, the subroutine SUB-4A is called at step #312 so that the film may be automatically rewound in the high speed mode. When this switch $SW_{REW}$ is on at step #311, the subroutine SUB-4B is called at step #313 so that the film may be automatically rewound in the silence mode.

Steps #331 to #333 are the same as steps #311 to #313. Accordingly, it is judged at step #331 whether the arbitrarily rewinding switch $SW_{REW}$ is on or off. When this switch $SW_{REW}$ is off, the subroutine SUB-5A is called at step #332 so that the film can be arbitrarily rewound enroute in the high speed mode. When this switch $SW_{REW}$ is on, the subroutine SUB-5B is called at step #333 so that the film can be arbitrarily rewound enroute in the silence mode.

Accordingly, in this subroutine SUB-3A, when the switch $SW_{REW}$ is turned on during the film rewinding operation, the film is rewound in the silence mode only during the period in which the switch $SW_{REW}$ is kept on.

Figure 23:
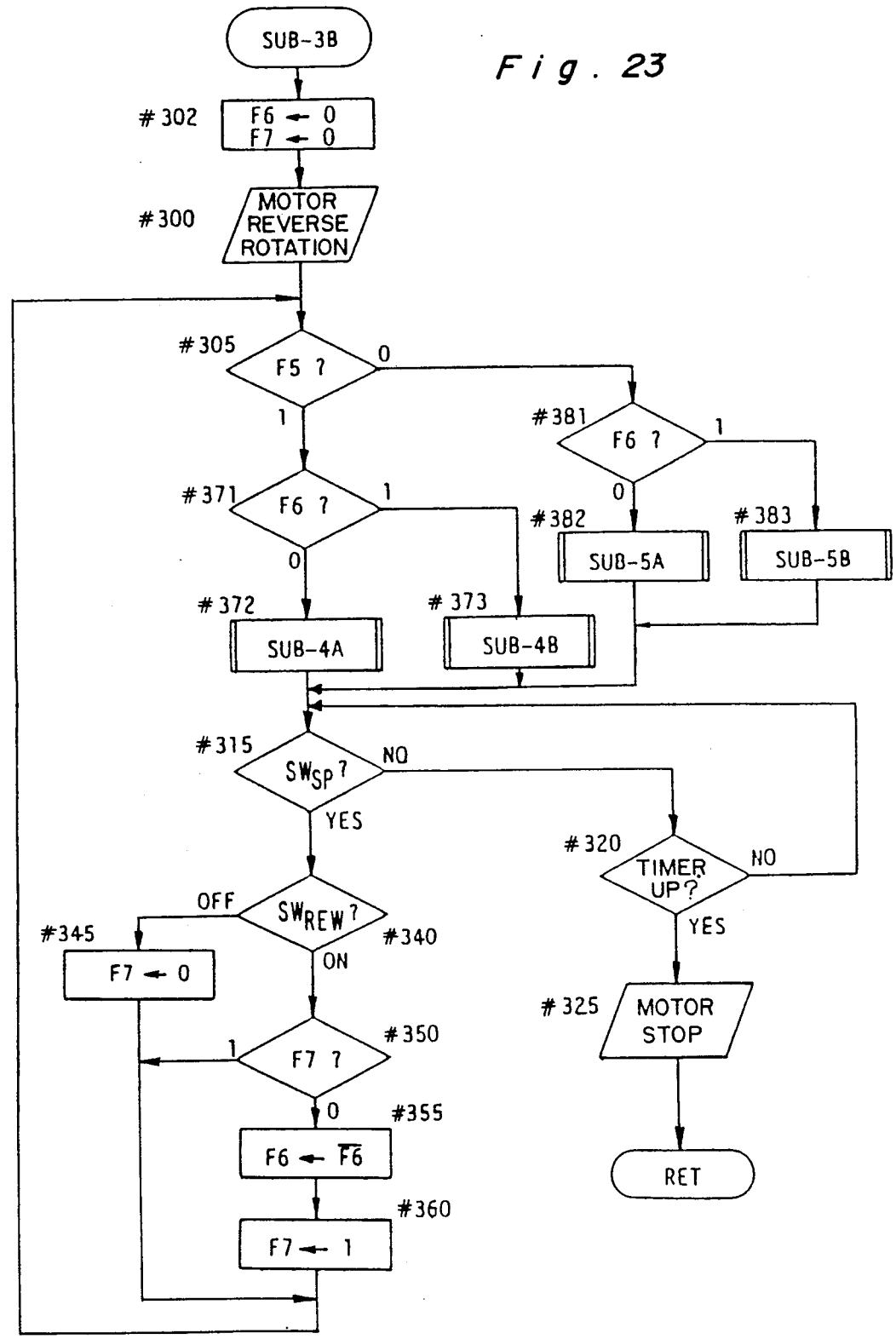
FIG. 23 is a flow-chart similar to FIG. 16, which particularly shows another modification thereof.

FIG. 23 represents another modification SUB-3B of the subroutine SUB-3. In this modification SUB-3B, steps #371 to #373 and steps #381 to #383 are respectively used in place of step #310 and #330 in the subroutine SUB-3. This modification SUB-3B differs from the aforementioned one SUB-3A in that the former is provided with steps #371 and #381 for judging the flag F6 in place of steps #311 and #331 of the latter for judging whether the arbitrarily rewinding switch $SW_{REW}$ is on or off, and in that steps #340 to #360 for reversing the flag F6 whenever the switch $SW_{REW}$ is turned on are provided in a loop returning to step #305 from step #315.

It is judged at step #340 whether the switch $SW_{REW}$ is on or off. When the switch S is off at step #340, an arbitrarily rewinding switch flag F7 is rendered to be 0 at step #345. The flag F7 is rendered to be 1 when the switch $SW_{REW}$ is on whereas the flag F7 is rendered to be 0 when the switch $SW_{REW}$ is off. When the switch $SW_{REW}$ is on at step #340, the flag F7 is judged at step #350. When the flag F7 is 1 at step #350 which implies that the switch $SW_{REW}$ is kept on, no switching is performed in the film rewinding mode. When the flag F7 is 0 at step #350 which implies the switch $SW_{REW}$ has been turned on, the flag F6 is reversed at step #355 and the flag F7 is rendered to be 1 at step #360. The flag F6 is a film rewinding mode flag, which is used at step #371 or #382 for switching between the high speed mode (step #372 or #382) and the silence mode (step #373 or #383). The high speed mode is selected when the flag F6 is 0 whereas the silence mode is selected when the flag F6 is 1. When this subroutine SUB-3B has been called, both the flags F6 and F7 are initially rendered to be 0 at step #302. Accordingly, the film is rewound in the high speed mode at first. However, if the operator turns the switch $SW_{REW}$ on, the high speed mode is switched to the silence mode, and if the operator turns the switch $SW_{REW}$ on again, the film rewinding mode is switched to the high speed mode again. Likewise, the film rewinding mode is switched alternately between the high speed mode and the silence mode whenever the switch $SW_{REW}$ is turned on.

As described above, the camera according to the present invention is provided with a film electrically advancing and/or rewinding device and is characterized in that the high speed mode and the silence mode can be switched to each other. Accordingly, any photographer can increase the feed speed of the film or lower noise in feeding the film by himself as occasion demands.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A photographic camera comprising:
    an electric motor for advancing the film;
    film advancement controlling means for controlling a film advancement achieved by said electric motor so as to advance the film by one frame whenever a shutter release member is depressed;
    a signal output member for selectively outputting either one of a first signal and a second signal in compliance with manual operation; and
    motor driving means for driving said motor in either one of a first mode in which said motor driving means drives said motor at a low speed so as to lower winding noise and a second mode in which said motor driving means drives said motor at a high speed, said first mode being selected when said first signal is outputted, said second mode being selected when said second signal is outputted.

2. The camera according to claim 1, wherein said motor driving means comprises a pulse generating means so that said motor is intermittently driven in compliance with pulse signals generated thereby in said first mode or continuously driven in said second mode.

3. The camera according to claim 1, wherein said signal output member comprises a slide member which can be manually switched between a first position for outputting said first signal and a second position for outputting said second signal.

4. A photographic camera provided with electrical film rewinding device for electrically rewinding a film, said camera comprising:
    a first electric motor for rewinding the film;
    a signal output member for selectively outputting either one of a first signal and a second signal in compliance with manual operation; and
    a first motor driving means for driving said motor in either one of a first mode in which said motor driving means drives said motor at a low speed so as to lower rewinding noise and a second mode in which said motor driving means drives said motor at a high speed, said first mode being selected when said first signal is outputted, said second mode being selected when said second signal is outputted.

5. The camera according to claim 4, wherein said motor driving means comprises a pulse generating means so that said motor is intermittently driven in compliance with pulse signals generated thereby in said first mode or continuously driven in said second mode.

6. The camera according to claim 4, further comprising a second electric motor for electrically advancing the film and a second motor driving means for driving said second motor in either one of a first mode in which said second motor driving means drives said second motor at a low speed so as to lower winding noise and a second mode in which said second motor driving means drives said second motor at a high speed, said first mode being selected when said first signal is outputted, said second mode being selected when said second signal is outputted.

7. The camera according to claim 6, wherein said second motor driving means comprises a pulse generating means so that said second motor is intermittently driven in compliance with pulse signals generated thereby in said first mode or continuously driven in said second mode.

8. The camera according to claim 7, wherein said first motor acts also as said second motor.

9. The camera according to claim 4, wherein said signal output member comprises a slide member which can be manually switched between a first position for outputting said first signal and a second position for outputting said second signal.

10. The camera according to claim 4, wherein said signal output member comprises an automatic return type manually operable member for outputting said first signal when manually operated and said second signal when not operated.

11. The camera according to claim 4, wherein said signal output member comprises an automatic return type manually operable member for alternately outputting either one of said first and second signals whenever manually operated.

12. A photographic camera comprising:
    an electric motor for advancing a film loaded in the camera;
    a signal output member for selectively outputting either one of a first select signal and a second select signal in compliance with manual operation;
    pulse generating means for selectively generating, in response to the signal outputted by said signal output member, a first driving signal and a second driving signal having a duty factor which is different from that of the first driving signal; and
    motor driving means for driving said motor by means of the driving signal generated by said pulse generating means in either one of a first mode in which said motor driving means drives said motor at a low speed so as to lower winding noise and second mode in which said motor driving means drives said motor at a high speed.

13. A camera according to claim 12, wherein said motor driving means drives said motor intermittently in compliance with the first driving signal generated by said pulse generating means in said first mode and drives said motor continuously in compliance with the second driving signal generated by said pulse generating means in said second mode.

14. A camera according to claim 12, wherein said signal output member comprises a slide member which can be manually switched between a first position for outputting said first select signal and a second position for outputting said second select signal.

15. A camera according to claim 12, wherein said first driving signal generated by said pulse generating means is a intermittent signal and said second driving signal is a continuous signal.

* * * * *